United States Patent
Zhang et al.

(10) Patent No.: US 10,616,815 B2
(45) Date of Patent: Apr. 7, 2020

(54) CELL MEASUREMENT REPORTING METHOD AND USER EQUIPMENT

(71) Applicant: Huawei Technologies Co., Ltd., Shenzhen (CN)

(72) Inventors: Lili Zhang, Beijing (CN); Richard Stirling-Gallacher, Munich (DE); Guorong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/776,238

(22) PCT Filed: Nov. 16, 2015

(86) PCT No.: PCT/CN2015/094688
§ 371 (c)(1),
(2) Date: May 15, 2018

(87) PCT Pub. No.: WO2017/084005
PCT Pub. Date: May 26, 2017

(65) Prior Publication Data
US 2019/0320372 A1    Oct. 17, 2019

(51) Int. Cl.
*H04W 36/00* (2009.01)
*H04W 36/22* (2009.01)
(Continued)

(52) U.S. Cl.
CPC .......... *H04W 36/22* (2013.01); *H04W 24/10* (2013.01); *H04W 36/0058* (2018.08);
(Continued)

(58) Field of Classification Search
CPC . H04W 36/32; H04W 36/0058; H04W 24/10; H04W 36/30; H04W 88/02; H04W 8/245; H04M 1/72519; H04M 1/72522
(Continued)

(56) References Cited

U.S. PATENT DOCUMENTS

| 2011/0281615 A1 | 11/2011 | Yamada et al. |
| 2012/0028627 A1 | 2/2012 | Hunzinger |

(Continued)

FOREIGN PATENT DOCUMENTS

| CN | 101247621 A | 8/2008 |
| CN | 101867968 A | 10/2010 |

(Continued)

OTHER PUBLICATIONS

Huawei, et al., "Discussion on RRM measurements for SCG in dual connectivity," XP050817800, R2-141289, 3GPP TSG-RAN WG2 Meeting #85bis, Mar. 31-Apr. 4, 2014, 5 pages.
(Continued)

*Primary Examiner* — Danh C Le
(74) *Attorney, Agent, or Firm* — Conley Rose, P.C.

(57) ABSTRACT

Described herein is a cell measurement reporting method and a related device and system. The method includes receiving, by a user equipment, measurement configuration information configured by a network side, and selecting a serving cell according to the measurement configuration information; and measuring, by the user equipment, the selected serving cell according to the measurement configuration information, and when determining that a measurement result of the serving cell meets the trigger event, sending, by the user equipment to the network side according to an indication of the measurement configuration information, a measurement report that carries the trigger event.

17 Claims, 3 Drawing Sheets

(51) Int. Cl.
*H04W 24/10* (2009.01)
*H04W 36/30* (2009.01)
*H04M 1/725* (2006.01)

(52) U.S. Cl.
CPC ........ *H04W 36/30* (2013.01); *H04M 1/72519* (2013.01); *H04M 1/72522* (2013.01)

(58) Field of Classification Search
USPC ................ 455/437, 550.1, 418; 370/331
See application file for complete search history.

(56) References Cited

U.S. PATENT DOCUMENTS

| | | |
|---|---|---|
| 2014/0036707 A1 | 2/2014 | Kitazoe et al. |
| 2014/0269632 A1 | 9/2014 | Blankenship et al. |
| 2014/0301235 A1* | 10/2014 | Ahn ................ H04W 16/14 370/252 |
| 2014/0328327 A1* | 11/2014 | Xiao ................ H04W 36/30 370/332 |
| 2015/0009802 A1* | 1/2015 | Wager ............... H04W 76/18 370/218 |
| 2015/0223095 A1 | 8/2015 | Centonza et al. |
| 2015/0331618 A1* | 11/2015 | Farrell ................ G11B 5/86 711/115 |
| 2015/0365859 A1 | 12/2015 | Dalsgaard et al. |
| 2016/0198385 A1* | 7/2016 | Braun ............. H04W 36/0094 455/437 |
| 2016/0205600 A1* | 7/2016 | Xu ................ H04W 36/0072 455/437 |
| 2016/0219473 A1* | 7/2016 | Teyeb ............. H04W 36/0088 |
| 2016/0285679 A1* | 9/2016 | Dudda ............... H04W 24/02 |
| 2016/0323868 A1* | 11/2016 | Kalhan ............ H04W 72/1278 |
| 2016/0330641 A1 | 11/2016 | Zhang et al. |
| 2017/0111831 A1 | 4/2017 | Xiao et al. |
| 2017/0238228 A1* | 8/2017 | Zhang ............. H04W 36/0061 370/331 |
| 2017/0251388 A1* | 8/2017 | Persson ............. H04B 17/318 |
| 2018/0332492 A1* | 11/2018 | Wang ............... H04W 24/10 |

FOREIGN PATENT DOCUMENTS

| | | |
|---|---|---|
| CN | 102104926 A | 6/2011 |
| CN | 102293032 A | 12/2011 |
| CN | 102726097 A | 10/2012 |
| CN | 104506292 A | 4/2015 |
| CN | 104509153 A | 4/2015 |
| CN | 104937980 A | 9/2015 |
| EP | 2787760 A1 | 10/2014 |
| WO | 2011041753 A2 | 4/2011 |
| WO | 2013107414 A1 | 7/2013 |
| WO | 2014110799 A1 | 7/2014 |
| WO | 2014162172 A1 | 10/2014 |
| WO | 2015109516 A1 | 7/2015 |

OTHER PUBLICATIONS

Foreign Communication From a Counterpart Application, European Application No. 15908502.6, Extended European Search Report dated Jul. 9, 2018, 13 pages.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.7.0, Sep. 2015, 453 pages.
"LTE Release 12 and Beyond," RWS-120003, 3GPP RAN WS on Rel-12 and onwards, Jun. 11-12, 2012, 10 pages.
Ericsson, "Views on Rel-12," RWS-120003, Jun. 1, 2012, 13 pages.
Foreign Communication From a Counterpart Application, PCT Application No. PCT/CN2015/094688, English Translation of International Search Report dated Aug. 22, 2016, 3 pages.
Foreign Communication From a Counterpart Application, PCT Application No. PCT/CN2015/094688, English Translation of Written Opinion dated Aug. 22, 2016, 8 pages.
Machine Translation and Abstract of Chinese Publication No. CN101247621, Aug. 20, 2008, 16 pages.
Machine Translation and Abstract of Chinese Publication No. CN101867968, Oct. 20, 2010, 18 pages.
Machine Translation and Abstract of Chinese Publication No. CN102104926, Jun. 22, 2011, 19 pages.
Machine Translation and Abstract of Chinese Publication No. CN104506292, Apr. 8, 2015, 19 pages.
Foreign Communication From a Counterpart Application, Chinese application No. 201580083673.0, Chinese Office Action dated Nov. 1, 2019, 14 pages.

* cited by examiner

CELL MEASUREMENT REPORTING METHOD AND USER EQUIPMENT

CROSS-REFERENCE TO RELATED APPLICATIONS

This application is a national stage of International Application No. PCT/CN2015/094688, filed on Nov. 16, 2015, which is hereby incorporated by reference in its entirety

TECHNICAL FIELD

The present disclosure relates to the field of wireless communications technologies, and in particular, to a cell measurement reporting method and user equipment.

BACKGROUND

With an increase in network deployment density and a growth of service demand, to increase a system capacity and improve spectral efficiency, dual connection, which is also referred to as inter-base station carrier aggregation (CA), and multi-stream connection are introduced into a Long Term Evolution (LTE) system. That is, a virtual cell layer is added to a macro cell layer, and an idle frequency band at an edge of a base station and an inter-cell interference coordination technology are used, so as to effectively improve network mobility and migration. For example, macro cell control plane signaling whose operating frequency is less than or equal to 2 GHz and mobility support whose operating frequency is less than or equal to 2 GHz are used, and a small cell offload service whose operating frequency is at least 3 GHz is used. Because small cells have small coverage and are densely deployed, sufficient frequency resources can be provided for user equipment (UE) in a local hotspot area, and a loss of a link from the UE to the small cell is low. In a scenario in which a macro cell and a small cell coexist, UE performs radio resource management measurement, that is, measures a cell reference signal to obtain measurement results of a serving cell and a neighboring cell, and determines, according to the measurement results, whether to trigger measurement reporting, so that a macro base station can determine, according to the measurement results, whether to perform handover, addition, release, or another operation on the UE.

In Release (Rel) 8 to Release 10 of the $3^{rd}$ Generation Partnership Project (3GPP), a macro base station configures, for each of a macro cell and a virtual cell (the virtual cell includes a plurality of small cells), a corresponding measurement object and a corresponding measurement event reporting mechanism, to support mobility of UE in the virtual cell. A measurement event in a system is identified by Ax, and main measurement events include an event A1, an event A2, an event A3, an event A4, an event A5, and an event A6. When performing measurement, the UE reports an event when determining that a measurement result meets the event. In a multiple connection scenario in which there is a virtual cell, because there is a relatively large quantity of UEs that perform multiple connection, a large quantity of redundant measurement reports are generated when the UEs report measurement events to a base station. As a result, a large quantity of radio resources are occupied, and load of the UE and a network is increased.

SUMMARY

The present disclosure provides a cell measurement reporting method and user equipment, so as to resolve a prior-art problem that redundant measurement reports increase network load when a measurement event is reported.

A first aspect of the present disclosure provides a cell measurement reporting method, where the method includes receiving, by user equipment, measurement configuration information configured by a network side, and selecting a serving cell according to the measurement configuration information, and measuring, by the user equipment, the serving cell according to the measurement configuration information, and when determining that a measurement result of the serving cell meets a preset trigger event, sending, to the network side according to an indication of the measurement configuration information, a measurement report that carries the trigger event, measuring, by the user equipment, the serving cell and a neighboring cell according to the measurement configuration information, where the neighboring cell is a cell on a carrier frequency indicated by a measurement object associated with the serving cell, and when determining that a measurement result of the serving cell and a measurement result of the neighboring cell meet the trigger event, sending, to the network side according to an indication of the measurement configuration information, a measurement report that carries the trigger event, or measuring, by the user equipment, the neighboring cell according to the measurement configuration information; and when determining that a measurement result of the neighboring cell meets the trigger event, sending, to the network side according to an indication of the measurement configuration information, a measurement report that carries the trigger event.

Optionally, the network side includes a macro cell and/or a main transmission point, and the serving cell is determined by the user equipment from the macro cell and a small cell.

Optionally, the measurement configuration information includes at least one of the following a configured measurement object, a frequency band of a measurement object, a cell list, a reporting manner, a measurement identifier, or an event parameter.

With reference to the first aspect, in a first implementation of the first aspect of the present disclosure, when the user equipment uses a multiple connection mode, the measurement object includes a first measurement object and a second measurement object, the serving cell includes a macro cell and a small cell, and the measuring the serving cell includes measuring, by the user equipment, the macro cell according to the first measurement object, and measuring the small cell according to the second measurement object, or measuring, by the user equipment, a virtual cell according to the first measurement object, and measuring a real cell according to the second measurement object. By using independent measurement and independent reporting, a measurement event is more proper, accuracy of trigger event reporting is improved, and a trigger event for the macro cell can be effectively distinguished from that for the small cell, so that a quantity of measurement reports is decreased.

With reference to the first implementation of the first aspect, in a second implementation of the first aspect of the present disclosure, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell. By using this mechanism, the user equipment sends the measurement report to only the main transmission point or the macro cell that sends the measurement configuration information, so that a quantity of measurement reports is decreased.

With reference to the second implementation of the first aspect, in a third implementation of the first aspect of the present disclosure, the sending, by the user equipment to the network side according to an indication of the measurement configuration information, a measurement report that carries the trigger event includes sending, by the user equipment to the macro cell, a measurement result corresponding to the first measurement object, and sending, to the macro cell or the small cell or a main transmission point of the small cell, a measurement result corresponding to the second measurement object, or sending, by the user equipment to the main transmission point of the virtual cell or the main transmission point of the cloud cell, a measurement result corresponding to the first measurement object, and sending, to one of the main transmission point of the virtual cell, the main transmission point of the cloud cell, or the real cell, a measurement result corresponding to the second measurement object.

With reference to the third implementation of the first aspect, in a fourth implementation of the first aspect of the present disclosure, the method further includes when signal quality of the virtual cell is lower than a preset threshold, measuring, by the user equipment, a neighboring virtual cell of the virtual cell, a real cell in the neighboring virtual cell, or a neighboring real cell of the virtual cell.

With reference to the first aspect or the first to the fourth implementations of the first aspect, in a fifth implementation of the first aspect of the present disclosure, the trigger event includes an event A2 and an event A3, and the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell. By redefining the serving cell and a trigger event that needs to be reported, effectiveness of reporting an important trigger event is improved.

With reference to the first aspect or the first to the fourth implementations of the first aspect, in a sixth implementation of the first aspect of the present disclosure, the trigger event includes an event A3, an event A4, and an event A5, and when the user equipment uses the multiple connection mode, that the serving cell is determined by the user equipment from the macro cell and a small cell includes for the event A3, the event A4, and the event A5, using, by the user equipment, the macro cell as the serving cell, and the measuring the serving cell and a neighboring cell includes separately measuring the macro cell and the neighboring cell, where the neighboring cell includes a cell on a carrier frequency indicated by a measurement object associated with the macro cell. By redefining a to-be-measured frequency group according to an operation mode of the UE, only crucial and useful measurement reports are reported, and reporting is more targeted and efficient.

With reference to the first aspect or the first to the fourth implementations of the first aspect, in a seventh implementation of the first aspect of the present disclosure, the trigger event includes an event A3, an event A4, and an event A5, and when the user equipment uses a single connection mode, that the serving cell is determined by the user equipment from the macro cell and a small cell includes for the event A3, the event A4, and the event A5, using, by the user equipment, both the macro cell and the small cell as the serving cell, and the measuring the serving cell and a neighboring cell includes separately measuring, by the user equipment, the macro cell, the small cell, and the neighboring cell, where the neighboring cell includes a cell on a carrier frequency indicated by a measurement object associated with the macro cell, and a cell on a carrier frequency indicated by a measurement object associated with the small cell. By redefining a to-be-measured frequency group according to an operation mode of the UE, only crucial and useful measurement reports are reported, and reporting is more targeted and efficient.

With reference to the sixth or the seventh implementation of the first aspect, in an eighth implementation of the first aspect of the present disclosure, the event A3, the event A4, and the event A5 meet at least one of the following, the event A3 includes a cell in which the event A3 is triggered is indicated on a first frequency associated with the measurement object, where the first frequency is different from a frequency used by the primary serving cell, in the single connection mode, the measurement object includes a macro cell frequency group and a virtual cell frequency group, or in the multiple connection mode, the measurement object includes a macro cell frequency group, the event A4 includes a cell in which the event A4 is triggered is indicated on a second frequency associated with the measurement object, where the second frequency is different from a frequency used by the primary serving cell, or in the single connection mode, the measurement object includes a macro cell frequency group and a virtual cell frequency group, or in the multiple connection mode, the measurement object includes a macro cell frequency group, and the event A5 includes a cell in which the event A5 is triggered is indicated on a third frequency associated with the measurement object, where the third frequency is different from a frequency used by the primary serving cell, or in the single connection mode, the measurement object includes a macro cell frequency group and a virtual cell frequency group, or in the multiple connection mode, the measurement object includes a macro cell frequency group. By redefining a note of an event, a to-be-measured frequency group is selected in a targeted manner when the selection is based on an operation mode of the UE and a frequency group, so that only crucial and useful measurement reports are reported, and reporting is more targeted and efficient.

With reference to the first aspect or the first to the fifth implementations of the first aspect, in a ninth implementation of the first aspect of the present disclosure, when the user equipment uses a single connection mode, the trigger event includes the event A3, an event A4, and an event A5, when the user equipment uses the multiple connection mode, the serving cell is the small cell, and the trigger event includes an event A7, an event A8, and an event A9, the event A7 includes signal quality of the neighboring cell is higher than that of a serving cell in a frequency group to which the primary serving cell belongs by a fifth offset value, the event A8 includes signal quality of the neighboring cell is higher than a fourth threshold corresponding to a frequency group to which the primary serving cell belongs by a sixth offset value, and the event A9 includes signal quality of the primary serving cell is lower than a fifth threshold, and signal quality of the neighboring cell is higher than a sixth threshold corresponding to a frequency group to which the primary serving cell belongs by a seventh offset value. A new event is added, in 3GPP TS36.331, for a particular frequency group of the small cell, to predefine trigger events that are reported when the UE is in different operation modes, so as to improve flexibility of a measurement mechanism. In addition, the UE reports only crucial and useful measurement reports, and a quantity of measurement events that need to be reported is decreased, thereby reducing signaling consumption.

With reference to the fourth to the ninth implementations of the first aspect, in a tenth implementation of the first aspect of the present disclosure, the method further includes measuring, by the user equipment, the small cell, the macro cell, and a neighboring small cell of the small cell, and further performing, by the user equipment, at least one of the following, when both signal quality of the small cell and signal quality of the neighboring small cell are lower than the preset threshold, and signal quality of the macro cell is in a stable state, switching, by the user equipment, to the single connection mode, and reporting the event A2 for the neighboring small cell, when signal quality of the small cell is lower than the preset threshold or a preset offset value, and signal quality of the neighboring small cell belonging to a same macro base station as the small cell is higher than the preset threshold, being handed over, by the user equipment, to the neighboring small cell, and reporting the event A2 and the event A3 for the neighboring cell, or when both signal quality of the small cell and signal quality of the macro cell are lower than the preset threshold, reconnecting or switching, by the user equipment, to a macro link or a small cell link, or reconfiguring, by the user equipment, a macro link, or switching to a macro link, and reporting the event A2 and the event A3 that are for the macro cell and the small cell, or reporting the event A2 and the event A3 for the macro cell and the event A2 for the small cell. A behavior of the UE is redefined according to a mobility scenario of a cell, so as to reduce measurement reports for the event A3, the event A4, or the event A5, and effectively reduce excessive exchange, of measurement reports on a backhaul link, between a base station of the virtual cell and the macro base station. Therefore, the macro base station can process mobility of the virtual cell more agilely and efficiently.

A second aspect of the present disclosure provides a cell measurement reporting method, where the method includes determining, by user equipment, a serving cell, and measuring, by the user equipment, the serving cell, and when determining that a measurement result of the serving cell meets a preset trigger event, sending, to a network side, a measurement report that carries the trigger event, or measuring, by the user equipment, the serving cell and a neighboring cell, and when determining that a measurement result of the serving cell meets a preset trigger event, sending, to a network side, a measurement report that carries the trigger event, or measuring, by the user equipment, the neighboring cell, and when determining that a measurement result of the neighboring cell meets the trigger event, sending, to a network side, a measurement report that carries the trigger event, where the neighboring cell is a cell on a carrier frequency indicated by a measurement object associated with the serving cell, and the trigger event includes at least one of an event A3 or an event A6, where the event A3 includes between real cells, signal quality of the neighboring cell is higher than signal quality of a primary serving cell by a first offset value, and between a real cell and a virtual cell, a second offset value is higher than the signal quality of the primary serving cell, the event A6 includes between real cells, signal quality of the neighboring cell is higher than signal quality of a secondary serving cell by a first offset value; and between a real cell and a virtual cell, the second offset value is higher than the signal quality of the secondary serving cell. By separately adding, in the event A3 and the event A6, an offset value for a virtual cell, a deviation between measurement results for a VCRS and a CRS is eliminated, and real cell measurement is distinguished from virtual cell measurement, so that a measurement event is triggered more properly and accurately.

With reference to the second aspect, in a first implementation of the second aspect of the present disclosure, the measuring the serving cell includes for the event A3, using a macro cell or a small cell as the serving cell, and for the event A6, using the macro cell or the small cell as the serving cell.

With reference to the second aspect or the first implementation of the second aspect, in a second implementation of the second aspect of the present disclosure, when the user equipment uses a multiple connection mode, the measurement object includes a first measurement object and a second measurement object, and the measuring the serving cell includes measuring, by the user equipment, the macro cell according to the first measurement object, and measuring the small cell according to the second measurement object, or measuring, by the user equipment, a virtual cell according to the first measurement object, and measuring a real cell according to the second measurement object. By configuring an independent measurement object for each of the macro cell and the small cell, a redundant measurement report is reduced, so as to reduce signaling consumption.

With reference to the second implementation of the second aspect, in a third implementation of the second aspect of the present disclosure, the network side includes the macro cell and/or a main transmission point, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

With reference to the third implementation of the second aspect, in a fourth implementation of the second aspect of the present disclosure, the main transmission point is a main transmission point of the virtual cell or a main transmission point of a cloud cell.

With reference to the fourth implementation of the second aspect, in a fifth implementation of the second aspect of the present disclosure, the sending, to a network side, a measurement report that carries the trigger event includes sending, by the user equipment to the macro cell, a measurement result corresponding to the first measurement object, and sending, to the macro cell or the small cell or a main transmission point of the small cell, a measurement result corresponding to the second measurement object, or sending, by the user equipment to the main transmission point of the virtual cell or the main transmission point of the cloud cell, a measurement result corresponding to the first measurement object, and sending, to one of the main transmission point of the virtual cell, the main transmission point of the cloud cell, or the real cell, a measurement result corresponding to the second measurement object.

With reference to the fifth implementation of the second aspect, in a sixth implementation of the second aspect of the present disclosure, the method further includes when signal quality of the virtual cell is lower than a preset threshold, measuring, by the user equipment, a neighboring virtual cell of the virtual cell, a real cell in the neighboring virtual cell, or a neighboring real cell of the virtual cell.

With reference to the second to the sixth implementations of the second aspect, in a seventh implementation of the second aspect of the present disclosure, the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell. Redundant measurement reporting is further reduced by adding a definition of the serving cell in a measurement program.

A third aspect of the present disclosure provides a cell measurement reporting method, where the method includes determining, by user equipment, a serving cell, where the serving cell includes a primary serving cell and at least one secondary serving cell, and measuring, by the user equipment, the serving cell, and when determining that a measurement result of the serving cell meets a preset trigger event, sending, to a network side, a measurement report that carries the trigger event, or measuring, by the user equipment, the serving cell and a neighboring cell, and when determining that a measurement result of the serving cell and a measurement result of the neighboring cell meet the trigger event, sending, to a network side, a measurement report that carries the trigger event, or measuring, by the user equipment, the neighboring cell, and when determining that a measurement result of the neighboring cell meets the trigger event, sending, to a network side, a measurement report that carries the trigger event, where the neighboring cell is a cell on a carrier frequency indicated by a measurement object associated with the serving cell, and the trigger event includes at least one of an event A3, an event A4, an event A5, or an event A6, where the event A3 includes signal quality of the neighboring cell is higher than signal quality of the primary serving cell by a third offset value, and the event A3 further includes at least one of the following, backhaul link load is greater than a locally requested available capacity of a backhaul link, or a hop count of a flexible backhaul link is less than a locally requested hop count, the event A4 includes signal quality of the neighboring cell is higher than a first threshold, and the event A4 further includes at least one of the following, backhaul link load is greater than a locally requested available capacity of a backhaul link, or a hop count of a flexible backhaul link is less than a locally requested hop count, the event A5 includes signal quality of the primary serving cell is lower than a second threshold, and signal quality of the neighboring cell is higher than a third threshold, and the event A5 further includes at least one of the following, backhaul link load is greater than a locally requested available capacity of a backhaul link, or a hop count of a flexible backhaul link is less than a locally requested hop count, and the event A6 includes signal quality of the neighboring cell is higher than signal quality of the secondary serving cell by a fourth offset value, and the event A6 further includes at least one of the following, backhaul link load is greater than a locally requested available capacity of a backhaul link, or a hop count of a flexible backhaul link is less than a locally requested hop count. By adding determining of the backhaul link load and/or the hop count of the flexible backhaul link, interaction between a base station of the virtual cell and the macro base station is reduced, a service delay of the user equipment is decreased, and user experience is improved.

A fourth aspect of the present disclosure provides user equipment, where the user equipment includes a transmitter, a receiver configured to receive measurement configuration information configured by a network side, a processor configured to select a serving cell according to the measurement configuration information received by the receiver, and a measurer configured to measure the serving cell according to the measurement configuration information, and when determining that a measurement result of the serving cell meets a preset trigger event, send, to the network side according to an indication of the measurement configuration information by using the transmitter, a measurement report that carries the trigger event, where the measurer is further configured to measure the serving cell and a neighboring cell according to the measurement configuration information, where the neighboring cell is a cell on a carrier frequency indicated by a measurement object associated with the serving cell, and when determining that a measurement result of the serving cell and a measurement result of the neighboring cell meet the trigger event, send, to the network side according to an indication of the measurement configuration information by using the transmitter, a measurement report that carries the trigger event, and the measurer is further configured to measure the neighboring cell according to the measurement configuration information; and when determining that a measurement result of the neighboring cell meets the trigger event, send, to the network side according to an indication of the measurement configuration information by using the transmitter, a measurement report that carries the trigger event.

Optionally, the network side includes a macro cell and/or a main transmission point, and the serving cell is determined by the user equipment from the macro cell and a small cell.

Optionally, the measurement configuration information includes at least one of the following, a configured measurement object, a frequency band of a measurement object, a cell list, a reporting manner, a measurement identifier, or an event parameter.

With reference to the fourth aspect, in a first implementation of the fourth aspect of the present disclosure, when the user equipment uses a multiple connection mode, the measurement object includes a first measurement object and a second measurement object, the serving cell includes a macro cell and a small cell, and the measurer is configured to measure the macro cell according to the first measurement object, and measure the small cell according to the second measurement object, or measure a virtual cell according to the first measurement object, and measure a real cell according to the second measurement object.

With reference to the first implementation of the fourth aspect, in a second implementation of the fourth aspect of the present disclosure, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell.

With reference to the second implementation of the fourth aspect, in a third implementation of the fourth aspect of the present disclosure, the transmitter is configured to send, to the macro cell, a measurement result corresponding to the first measurement object, and send, to the macro cell or the small cell or a main transmission point of the small cell, a measurement result corresponding to the second measurement object, or send, to the main transmission point of the virtual cell or the main transmission point of the cloud cell, a measurement result corresponding to the first measurement object, and send, to one of the main transmission point of the virtual cell, the main transmission point of the cloud cell, or the real cell, a measurement result corresponding to the second measurement object.

With reference to the third implementation of the fourth aspect, in a fourth implementation of the fourth aspect of the present disclosure, the measurer is further configured to when signal quality of the virtual cell is lower than a preset threshold, measuring a neighboring virtual cell of the virtual cell, a real cell in the neighboring virtual cell, or a neighboring real cell of the virtual cell.

With reference to the fourth aspect or the first to the fourth implementations of the fourth aspect, in a fifth implementation of the fourth aspect of the present disclosure, the trigger event includes an event A2 and an event A3, and the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

With reference to the fourth aspect or the first to the fourth implementations of the fourth aspect, in a sixth implementation of the fourth aspect of the present disclosure, the trigger event includes an event A3, an event A4, and an event A5, and when the user equipment uses the multiple connection mode, that the serving cell is determined by the user equipment from the macro cell and a small cell includes for the event A3, the event A4, and the event A5, using, by the user equipment, the macro cell as the serving cell, and the measurer is configured to separately measure the macro cell and the neighboring cell, where the neighboring cell includes a cell on a carrier frequency indicated by a measurement object associated with the macro cell.

With reference to the fourth aspect or the first to the fourth implementations of the fourth aspect, in a seventh implementation of the fourth aspect of the present disclosure, the trigger event includes an event A3, an event A4, and an event A5, and when the user equipment uses a single connection mode, that the serving cell is determined by the user equipment from the macro cell and a small cell includes for the event A3, the event A4, and the event A5, using, by the user equipment, both the macro cell and the small cell as the serving cell, and the measurer is configured to separately measure, by the user equipment, the macro cell, the small cell, and the neighboring cell, where the neighboring cell includes a cell on a carrier frequency indicated by a measurement object associated with the macro cell, and a cell on a carrier frequency indicated by a measurement object associated with the small cell.

With reference to the sixth or the seventh implementation of the fourth aspect, in an eighth implementation of the fourth aspect of the present disclosure, the event A3, the event A4, and the event A5 meet at least one of the following, the event A3 includes a cell in which the event A3 is triggered is indicated on a first frequency associated with the measurement object, where the first frequency is different from a frequency used by the primary serving cell, in the single connection mode, the measurement object includes a macro cell frequency group and a virtual cell frequency group, or in the multiple connection mode, the measurement object includes a macro cell frequency group, the event A4 includes a cell in which the event A4 is triggered is indicated on a second frequency associated with the measurement object, where the second frequency is different from a frequency used by the primary serving cell, or in the single connection mode, the measurement object includes a macro cell frequency group and a virtual cell frequency group, or in the multiple connection mode, the measurement object includes a macro cell frequency group, and the event A5 includes a cell in which the event A5 is triggered is indicated on a third frequency associated with the measurement object, where the third frequency is different from a frequency used by the primary serving cell, or in the single connection mode, the measurement object includes a macro cell frequency group and a virtual cell frequency group, or in the multiple connection mode, the measurement object includes a macro cell frequency group.

With reference to the fourth aspect or the first to the fifth implementations of the fourth aspect, in a ninth implementation of the fourth aspect of the present disclosure, when the user equipment uses a single connection mode, the trigger event includes the event A3, an event A4, and an event A5, when the user equipment uses the multiple connection mode, the serving cell is the small cell, and the trigger event includes an event A7, an event A8, and an event A9, the event A7 includes signal quality of the neighboring cell is higher than that of a serving cell in a frequency group to which the primary serving cell belongs by a fifth offset value, the event A8 includes signal quality of the neighboring cell is higher than a fourth threshold corresponding to a frequency group to which the primary serving cell belongs by a sixth offset value, and the event A9 includes signal quality of the primary serving cell is lower than a fifth threshold, and signal quality of the neighboring cell is higher than a sixth threshold corresponding to a frequency group to which the primary serving cell belongs by a seventh offset value.

With reference to the fourth to the ninth implementations of the fourth aspect, in a tenth implementation of the fourth aspect of the present disclosure, the measurer is further configured to measure the small cell, the macro cell, and a neighboring small cell of the small cell, and the user equipment further includes a processor, and the processor performs at least one of the following, when both signal quality of the small cell and signal quality of the neighboring small cell are lower than the preset threshold, and signal quality of the macro cell is in a stable state, switching the user equipment to the single connection mode, and reporting the event A2 for the neighboring small cell by using the transmitter, when signal quality of the small cell is lower than the preset threshold or a preset offset value, and signal quality of the neighboring small cell belonging to a same macro base station as the small cell is higher than the preset threshold, handing over the user equipment to the neighboring small cell, and reporting the event A2 and the event A3 for the neighboring cell by using the transmitter; or when both signal quality of the small cell and signal quality of the macro cell are lower than the preset threshold, reconnecting or switching the user equipment to a macro link or a small cell link, or reconfiguring a macro link or switching the user equipment to a macro link, and reporting, by using the transmitter, the event A2 and the event A3 that are for the macro cell and the small cell, or reporting, by using the transmitter, the event A2 and the event A3 for the macro cell and the event A2 for the small cell.

A fifth aspect of the present disclosure provides user equipment, where the user equipment includes a transmitter, a processor configured to determine a serving cell, and a measurer configured to measure the serving cell, and when determining that a measurement result of the serving cell meets a preset trigger event, send, to a network side by using the transmitter, a measurement report that carries the trigger event, or measure the serving cell and a neighboring cell, and when determining that a measurement result of the serving cell meets a preset trigger event, send, to a network side by using the transmitter, a measurement report that carries the trigger event, or measure the neighboring cell, and when determining that a measurement result of the neighboring cell meets the trigger event, send, to a network side by using the transmitter, a measurement report that carries the trigger event, where the neighboring cell is a cell on a carrier frequency indicated by a measurement object associated with the serving cell, and the trigger event includes at least one of an event A3 or an event A6, where the event A3 includes between real cells, signal quality of the neighboring cell is higher than signal quality of a primary serving cell by a first offset value, and between a real cell and a virtual cell, a second offset value is higher than the signal quality of the primary serving cell, and the event A6 includes between real cells, signal quality of the neighboring cell is higher than signal quality of a secondary serving cell by a first offset value, and between a real cell and a virtual cell, the second offset value is higher than the signal quality of the secondary serving cell.

With reference to the fifth aspect, in a first implementation of the fifth aspect of the present disclosure, the processor is configured to for the event A3, use a macro cell or a small cell as the serving cell, and for the event A6, use the macro cell or the small cell as the serving cell.

With reference to the fifth aspect or the first implementation of the fifth aspect, in a second implementation of the fifth aspect of the present disclosure, when the user equipment uses a multiple connection mode, the measurement object includes a first measurement object and a second measurement object, and the measurer is configured to measure the macro cell according to the first measurement object, and measure the small cell according to the second measurement object, or measure a virtual cell according to the first measurement object, and measure a real cell according to the second measurement object.

With reference to the second implementation of the fifth aspect, in a third implementation of the fifth aspect of the present disclosure, the network side includes the macro cell and/or a main transmission point, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

With reference to the third implementation of the fifth aspect, in a fourth implementation of the fifth aspect of the present disclosure, the main transmission point is a main transmission point of the virtual cell or a main transmission point of a cloud cell.

With reference to the fourth implementation of the fifth aspect, in a fifth implementation of the fifth aspect of the present disclosure, the transmitter is configured to send, to the macro cell, a measurement result corresponding to the first measurement object, and send, to the macro cell or the small cell or a main transmission point of the small cell, a measurement result corresponding to the second measurement object, or send, to the main transmission point of the virtual cell or the main transmission point of the cloud cell, a measurement result corresponding to the first measurement object, and send, to one of the main transmission point of the virtual cell, the main transmission point of the cloud cell, or the real cell, a measurement result corresponding to the second measurement object.

With reference to the fifth implementation of the fifth aspect, in a sixth implementation of the fifth aspect of the present disclosure, the measurer is further configured to when signal quality of the virtual cell is lower than a preset threshold, measure a neighboring virtual cell of the virtual cell, a real cell in the neighboring virtual cell, or a neighboring real cell of the virtual cell.

With reference to the second to the sixth implementations of the fifth aspect, in a seventh implementation of the fifth aspect of the present disclosure, the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

A sixth aspect of the present disclosure provides user equipment, where the user equipment includes a transmitter, a processor configured to determine a serving cell, where the serving cell includes a primary serving cell and at least one secondary serving cell, and a measurer configured to measure the serving cell, and when determining that a measurement result of the serving cell meets a preset trigger event, send, to a network side by using the transmitter, a measurement report that carries the trigger event, or measure the serving cell and a neighboring cell, and when determining that a measurement result of the serving cell and a measurement result of the neighboring cell meet the trigger event, send, to a network side by using the transmitter, a measurement report that carries the trigger event, or measure the neighboring cell, and when determining that a measurement result of the neighboring cell meets the trigger event, send, to a network side by using the transmitter, a measurement report that carries the trigger event, where the neighboring cell is a cell on a carrier frequency indicated by a measurement object associated with the serving cell, and the trigger event includes at least one of an event A3, an event A4, an event A5, or an event A6, where the event A3 includes signal quality of the neighboring cell is higher than signal quality of the primary serving cell by a third offset value, and the event A3 further includes at least one of the following, backhaul link load is greater than a locally requested available capacity of a backhaul link, or a hop count of a flexible backhaul link is less than a locally requested hop count, the event A4 includes signal quality of the neighboring cell is higher than a first threshold, and the event A4 further includes at least one of the following, backhaul link load is greater than a locally requested available capacity of a backhaul link, or a hop count of a flexible backhaul link is less than a locally requested hop count, the event A5 includes signal quality of the primary serving cell is lower than a second threshold, and signal quality of the neighboring cell is higher than a third threshold, and the event A5 further includes at least one of the following, backhaul link load is greater than a locally requested available capacity of a backhaul link, or a hop count of a flexible backhaul link is less than a locally requested hop count, and the event A6 includes signal quality of the neighboring cell is higher than signal quality of the secondary serving cell by a fourth offset value, and the event A6 further includes at least one of the following, backhaul link load is greater than a locally requested available capacity of a backhaul link, or a hop count of a flexible backhaul link is less than a locally requested hop count.

In the present disclosure, the user equipment measures the selected serving cell and/or the neighboring cell according to the measurement configuration information, and then sends, to the network side according to the measurement configuration information, the measurement report that carries the trigger event. That is, when measuring only the serving cell, the user equipment performs measurement reporting for only the serving cell, and does not simultaneously perform measurement reporting for another cell, when measuring only the neighboring cell, the user equipment performs measurement reporting for only the neighboring cell, and does not perform measurement reporting for the serving cell, when measuring the selected serving cell and the neighboring cell of the serving cell, the user equipment performs measurement reporting for only the serving cell and the neighboring cell of the serving cell, and does not perform measurement reporting for another cell and a neighboring cell of the another cell. Therefore, a quantity of measurement reports is decreased. In addition, the user equipment may report a trigger event to only the network side according to the indication of the measurement configuration information, so that a quantity of measurement events that need to be reported can be further decreased, thereby reducing signaling consumption. Moreover, measurement reporting is pertinently performed for only the selected serving cell and/or the neighboring cell, and an unrelated cell is not measured and reported, so that measurement efficiency and reporting efficiency are improved.

DESCRIPTION OF EMBODIMENTS

Figure 1:
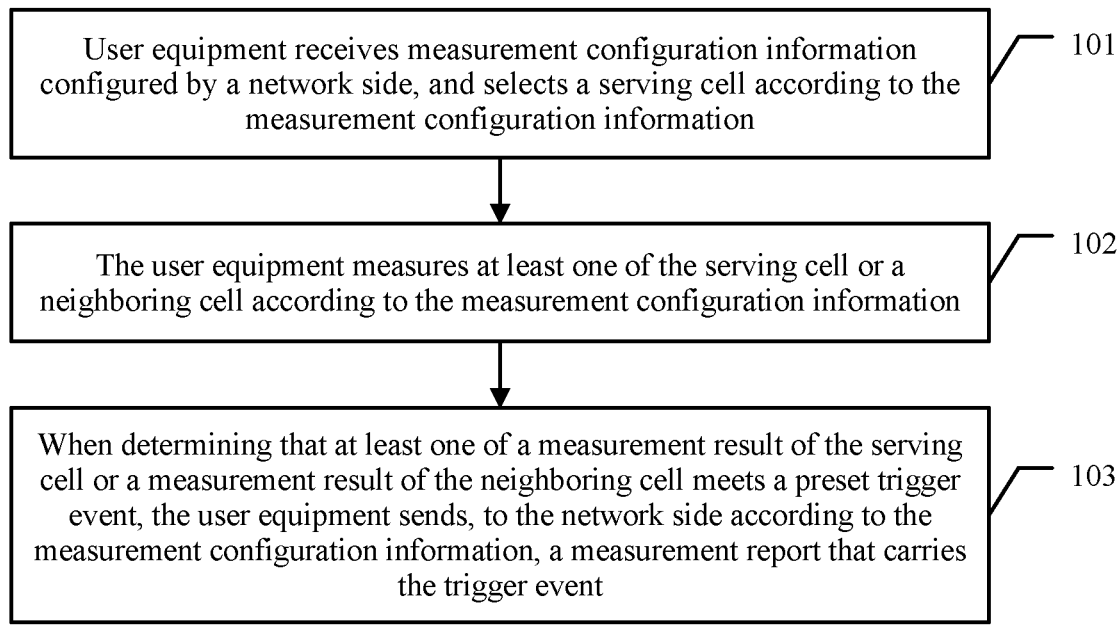
FIG. 1 is a flowchart of a cell measurement reporting method according to an embodiment of the present disclosure.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. In addition, the terms "include", "have", or any other variant thereof are intended to cover a non-exclusive inclusion. For example, a process, a method, a system, a product, or an apparatus that includes a series of steps or devices is not necessarily limited to the steps or devices that are expressly listed, but may include another step or device that is not expressly listed or inherent to the process, the method, the product, or the apparatus. The device division in this specification is merely logical division, and there may be another division during implementation. For example, a plurality of devices may be combined or integrated into another system, or some features may be ignored or not performed. In addition, the displayed or discussed mutual couplings or direct couplings or communication connections may be implemented by using some interfaces. The indirect couplings or communication connections between the devices may be implemented in electronic or other forms, and this is not limited in this specification. In addition, devices or sub-devices described as separate components may be or may not be physically separated, or may be or may not be physical devices, or may not be grouped into a plurality of circuits. Objectives of the solutions of the embodiments of the present disclosure may be achieved by selecting some or all of the devices according to requirements.

Embodiments of the present disclosure provide a cell measurement reporting method and user equipment that are used for an LTE network. A network architecture applicable to the embodiments of the present disclosure mainly includes carrier aggregation, dual connection, a virtual cell, or an ultra-dense network (UDN). Details are described below.

In an LTE system, an eNodeB controls a measurement behavior of UE by performing measurement configuration for the UE. During LTE handover, the UE needs to perform periodical reporting and event trigger reporting, to report a measurement result of a cell. The periodical reporting is configured by the eNodeB, and the UE directly reports a measurement result. The event trigger reporting is classified into an intra-frequency system event and an event between different systems, and an intra-frequency/inter-frequency handover event mainly includes the following events.

Event A1, signal quality of a serving cell is higher than a threshold.

Event A2, signal quality of a serving cell is lower than a threshold.

Event A3, signal quality of a neighboring cell is higher than that of a primary serving cell (Pcell) by an offset value.

Event A4, signal quality of a neighboring cell is higher than a threshold.

Event A5, signal quality of a Pcell is lower than a threshold 1, and signal quality of a neighboring cell is higher than a threshold 2.

Event A6, signal quality of a neighboring cell is higher than that of a secondary serving cell (Scell) by an offset value.

For example, the eNodeB defines, for different reported trigger events, corresponding serving cells, such as a measurement result that is of a cell and that needs to be used when the UE determines whether the event A3 is met, that is, a measurement result of a Pcell.

In a multiple connection scenario in which a macro cell and a virtual cell are deployed, because there is a relatively large quantity of UEs that perform multiple connection, a large quantity of redundant measurement reports are generated when the UEs report measurement events. As a result, a large quantity of radio resources are occupied, and load of the UE and a network is increased. In the embodiments of the present disclosure, the following idea is mainly used to resolve a measurement reporting redundancy problem.

1. An original measurement event is redefined by defining that a measurement event is reported to a measurement configuration entity or by modifying or adding a condition.

For example, if the measurement configuration entity is a macro cell, the trigger event is reported to only the macro cell, if the measurement configuration entity is a main transmission point, the trigger event is reported to only the main transmission point.

For another example, an independent measurement object is established for each of a macro cell and a small cell. By using independent measurement and independent reporting, a measurement event is more proper, accuracy of trigger event reporting is improved, and a trigger event for the macro cell can be effectively distinguished from that for the small cell.

For another example, the event A3, the event A4, and the event A5 are redefined based on a frequency group and an operation mode of the UE. That is, when the UE is in a single connection mode, the UE performs measurement and reporting for only the event A3 and for a macro cell frequency group and a virtual frequency group, so that redundant reporting can be reduced, and link quality of a small cell can be reported to the eNodeB. Alternatively, when the UE is in a multiple connection mode, the UE performs measurement and reporting for only the event A3/A4/A5 and for a macro cell frequency group, so that measurement reporting for a small cell is not triggered, that is, redundant reporting is reduced.

Alternatively, for another example, a new event A7, event A8, and event A9 are defined to replace the original event A3, event A4, and event A5 that are used in a multiple connection mode. That is, in the multiple connection mode, the event A7, the event A8, and the event A9 are dedicated to a neighboring cell in a particular frequency group to reduce redundant reporting.

Alternatively, a serving cell may be defined, and the serving cell is a corresponding cell that is measured and reported by the UE when the UE determines whether an event is met.

2. An event is reported when a measurement result meets the event.

In this specification, all measurement configuration information such as a measurement object, an event parameter, and a frequency group, is notified by the eNodeB to the UE by using radio resource control (RRC) signaling. The measurement object includes a carrier frequency, a carrier frequency group, and a cell set in a carrier frequency group. Details are not described in this specification.

Referring to FIG. 1, the following describes a cell measurement reporting method in an embodiment of the present disclosure from a perspective of user equipment. The method includes the following steps.

101. The user equipment receives measurement configuration information configured by a network side, and selects a serving cell according to the measurement configuration information.

The measurement configuration information is carried in a measurement configuration (MeasConfig) information element in RRC signaling. The measurement configuration information includes a measurement object that needs to be measured by the UE, a frequency band of a measurement object, a cell list, a reporting manner, a measurement identifier, an event parameter, and the like.

The user equipment may determine the serving cell from a macro cell and a small cell according to the measurement configuration information.

102. The user equipment measures at least one of the serving cell or a neighboring cell according to the measurement configuration information.

The neighboring cell is a cell on a carrier frequency indicated by a measurement object associated with the serving cell. The measuring at least one of the serving cell or a neighboring cell includes measuring, by the user equipment, the serving cell, measuring, by the user equipment, the serving cell and the neighboring cell, or measuring, by the user equipment, the neighboring cell.

Optionally, when using a multiple connection mode, the user equipment may configure an independent measurement object for each of the macro cell and the small cell. The measurement object includes a first measurement object and a second measurement object. The user equipment measures the macro cell according to the first measurement object, and measures the small cell according to the second measurement object, or the user equipment measures a virtual cell according to the first measurement object, and measures a real cell according to the second measurement object. With separate configuration, measurement of the macro cell can be effectively distinguished from that of the virtual cell, and this is more applicable to a UDN architecture in dense deployment.

For example, the first measurement object in an existing mechanism is a measurement object (MeasObject) configured when the macro cell and the virtual cell are not distinguished. In this solution, the first measurement object is used for measurement of only the macro cell. The second measurement object is a MeasObject secondary link SecondaryLink. An information element (IE) in the first measurement object and that in the second measurement object are the same, that is, measured items are the same. During multiple connection, the UE separately measures the two measurement objects. That is, when measuring the MeasObject, the UE considers only a Pcell/Scell of the macro cell as the serving cell, when measuring the MeasObject SecondaryLink, the UE considers only a Pcell/Scell of the small cell as the serving cell. Correspondingly, in a measurement result (MeasResult), the UE reports only a measurement result of the Pcell/Scell of the macro cell, in a measurement result MeasResultsSecondaryLink, the UE reports only a measurement result of the Pcell/Scell of the small cell.

Optionally, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

103. When determining that at least one of a measurement result of the serving cell or a measurement result of the neighboring cell meets a preset trigger event, the user equipment sends, to the network side according to the measurement configuration information, a measurement report that carries the trigger event.

Specifically, the following three scenarios are included.

The user equipment measures the selected serving cell according to the measurement configuration information, and when determining that the measurement result of the serving cell meets the trigger event, sends, to the network side according to the measurement configuration information, the measurement report that carries the trigger event.

The user equipment measures the serving cell and the neighboring cell according to the measurement configuration information, and when determining that the measurement result of the serving cell and the measurement result of the neighboring cell meet the preset trigger event, sends, to the network side according to the measurement configuration information, the measurement report that carries the trigger event.

The user equipment measures the neighboring cell according to the measurement configuration information, and when determining that the measurement result of the neighboring cell meets the trigger event, sends, to the network side according to the measurement configuration information, the measurement report that carries the trigger event.

The network side includes the macro cell and/or the main transmission point, that is, the user equipment sends the measurement report to only an entity that sends the measurement configuration information. The entity that sends the measurement configuration information is an entity that configures the measurement information, and the entity includes the macro cell or the main transmission point. The main transmission point is a main transmission point of the virtual cell. For example, if the measurement configuration information for the serving cell is configured by the macro cell, the UE reports the measurement report to only the macro cell, and does not need to report the measurement report to the main transmission point. Alternatively, if the measurement configuration information for the serving cell is configured by the main transmission point, the UE reports the measurement report to only the main transmission point, and does not need to report the measurement report to the macro cell. By using this mechanism, a quantity of measurement reports can be decreased. Optionally, the main transmission point is the main transmission point of the virtual cell or a main transmission point of a cloud cell.

It may be understood that the measurement report also carries a measurement result corresponding to a trigger event.

In step 102, because the user equipment configures the independent measurement object for each of the macro cell and the small cell, when reporting a trigger event, the user equipment sends, to the macro cell, a measurement result corresponding to the first measurement object, and sends, to the macro cell or the small cell or a main transmission point of the small cell, a measurement result corresponding to the second measurement object.

Alternatively, the user equipment sends, to the main transmission point of the virtual cell or the main transmission point of the cloud cell, a measurement result corresponding to the first measurement object, and sends, to one of the main transmission point of the virtual cell, the main transmission point of the cloud cell, or the real cell, a measurement result corresponding to the second measurement object. Optionally, the method further includes, when signal quality of the virtual cell is lower than a preset threshold, measuring, by the user equipment, a neighboring virtual cell of the virtual cell, a real cell in the neighboring virtual cell, or a neighboring real cell of the virtual cell.

It may be learned that by using independent measurement and independent reporting, a measurement event is more proper, accuracy of trigger event reporting is improved, and a trigger event for the macro cell can be effectively distinguished from that for the small cell.

In addition, because signal quality of the small cell is better than that of the macro cell in most scenarios, the small cell and the macro cell are not compared after separate configuration and measurement are used, that is, a result of comparison of the two types of cells is not reported, so that a quantity of measurement reports is decreased.

In this embodiment of the present disclosure, the user equipment measures the selected serving cell and/or the neighboring cell according to the measurement configuration information, and then sends, to the network side according to the measurement configuration information, the measurement report that carries the trigger event. That is, when measuring only the serving cell, the user equipment performs measurement reporting for only the serving cell, and does not simultaneously perform measurement reporting for another cell, when measuring only the neighboring cell, the user equipment performs measurement reporting for only the neighboring cell, and does not perform measurement reporting for the serving cell, when measuring the selected serving cell and the neighboring cell of the serving cell, the user equipment performs measurement reporting for only the serving cell and the neighboring cell of the serving cell, and does not perform measurement reporting for another cell and a neighboring cell of the another cell. Therefore, a quantity of measurement reports is decreased. In addition, the user equipment may report a trigger event to only a measurement configuration entity according to an indication of the measurement configuration information, so that a quantity of measurement events that need to be reported can be further decreased, thereby reducing signaling consumption. Moreover, measurement reporting is pertinently performed for only the selected serving cell, and measurement reporting is not performed for an unrelated cell, so that measurement reporting efficiency is improved.

For example, when measurement reporting is performed for the small cell, only the small cell and the neighboring cell are compared, that is, only a neighboring cell on a frequency of the small cell is reported. When measurement reporting is performed for the macro cell, the macro cell and the small cell are not compared, that is, measurement reporting is not performed for the small cell, so that a quantity of measurement reports is decreased. In addition, the measurement report is sent to the network side according to the measurement configuration information, so that it can be avoided that when the macro cell configures the measurement information, the UE sends an unnecessary measurement report to the main transmission point, and that when the main transmission point configures the measurement information, the UE sends an unnecessary measurement report to the macro cell. Therefore, a quantity of measurement events that need to be reported is further decreased, thereby reducing signaling consumption.

Optionally, in some embodiments of the disclosure, effectiveness of reporting an important trigger event can be improved by redefining the serving cell and a trigger event that needs to be reported. Details are as follows.

The trigger event includes an event A2 and an event A3, and the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

Optionally, in some embodiments of the disclosure, in addition to redefining the serving cell and configuring the independent measurement object for each of the macro cell and the serving cell, a to-be-measured frequency group may be redefined according to an operation mode of the UE, or on the basis of redefining the serving cell and configuring the independent measurement object for each of the macro cell and the serving cell, a to-be-measured frequency group may be redefined according to an operation mode of the UE, so that only critical and useful measurement reports are reported, and reporting is more targeted and efficient. Specifically, there are the following two cases.

1. When the user equipment uses the multiple connection mode, the trigger event includes an event A3, an event A4, and an event A5, and that the user equipment determines the serving cell from the macro cell and the small cell includes for the event A3, the event A4, and the event A5, using, by the user equipment, the macro cell as the serving cell, and the measuring at least one of the serving cell or a neighboring cell includes separately measuring the macro cell and the neighboring cell, where the neighboring cell includes a cell on a carrier frequency indicated by a measurement object associated with the macro cell.

2. When the user equipment uses a single connection mode, the trigger event includes an event A3, an event A4, and an event A5, and that the user equipment determines the serving cell from the macro cell and the small cell includes for the event A3, the event A4, and the event A5, using, by the user equipment, both the macro cell and the small cell as the serving cell, and the measuring at least one of the serving cell or a neighboring cell includes separately measuring, by the user equipment, the macro cell, the small cell, and the neighboring cell, where the neighboring cell includes a cell on a carrier frequency indicated by a measurement object associated with the macro cell, and a cell on a carrier frequency indicated by a measurement object associated with the small cell.

The foregoing two cases are based on the operation mode of the UE and a frequency group, and a to-be-measured frequency group may be specifically selected by redefining a note of an event.

1. Notes of the event A3 are modified in 3GPP TS36.331

The event A3 includes a cell in which the event A3 is triggered is indicated on a first frequency associated with the measurement object, where the first frequency is different from a frequency used by the primary serving cell, in the single connection mode, the measurement object includes a macro cell frequency group and a virtual cell frequency group, or in the multiple connection mode, the measurement object includes a macro cell frequency group.

Modified notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

2. A new note is added for the event A4 in TS36.331

The event A4 includes a cell in which the event A4 is triggered is indicated on a second frequency associated with the measurement object, where the second frequency is different from a frequency used by the primary serving cell, or in the single connection mode, the measurement object includes a macro cell frequency group and a virtual cell frequency group, or in the multiple connection mode, the measurement object includes a macro cell frequency group.

New notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

3. Notes of the event A5 are modified in TS36.331

The event A5 includes a cell in which the event A5 is triggered is indicated on a third frequency associated with the measurement object, where the third frequency is different from a frequency used by the primary serving cell, or in the single connection mode, the measurement object includes a macro cell frequency group and a virtual cell frequency group, or in the multiple connection mode, the measurement object includes a macro cell frequency group.

Modified notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

Optionally, in some embodiments of the disclosure, a new event may be added, in the 3GPP TS36.331, for a particular frequency group of the small cell, to predefine trigger events that are reported when the UE is in different operation modes, so as to improve flexibility of a measurement mechanism. In addition, the UE reports only crucial and useful measurement reports, and a quantity of measurement events that need to be reported is decreased, thereby reducing signaling consumption. For example, a new event A7, event A8, and event A9 are defined specially for the UE that uses the multiple connection mode, to replace the event A3, the event A4, and the event A5 in the original measurement mechanism, so that the UE uses the event A3, the event A4, and the event A5 in the original measurement mechanism when using the single connection mode, and uses the event A7, the event A8, and the event A9 when using the multiple connection mode.

1. When the user equipment uses the single connection mode, the trigger event includes the event A3, the event A4, and the event A5.

When the user equipment uses the multiple connection mode, the serving cell is the small cell, and the trigger event includes the event A7, the event A8, and the event A9.

2. Definitions of the new event A7, event A8, and event A9 are as follows.

The event A7 includes signal quality of the neighboring cell is higher than that of a serving cell in a frequency group to which the primary serving cell belongs by a fifth offset value.

Event A7 (replacing A3 in multiple connection mode) neighbor becomes offset better than serving within its own frequency groups.

The event A8 includes signal quality of the neighboring cell is higher than a fourth threshold corresponding to a frequency group to which the primary serving cell belongs by a sixth offset value.

Event A8 (replacing A4 in multiple connection mode) neighbor becomes offset better than threshold within its own frequency groups.

The event A9 includes signal quality of the primary serving cell is lower than a fifth threshold, and signal quality of the neighboring cell is higher than a sixth threshold corresponding to a frequency group to which the primary serving cell belongs by a seventh offset value.

Event A9 (replacing A5 in multiple connection mode) Pcell becomes worse than threshold1 and neighbor becomes better than threshold2 within its own frequency groups.

NOTE, UE will only consider Event A7/A8/A9 in multiple connection mode, and only consider Event A3/A4/A5 in single connection mode.

When the UE uses the multiple connection mode, the serving cell is the small cell.

Optionally, in some embodiments of the disclosure, a behavior of the UE may be redefined according to a mobility scenario of a cell, so as to reduce measurement reports for the event A3, the event A4, or the event A5, and effectively reduce excessive exchange, of measurement reports on a backhaul link, between a base station of the virtual cell and the macro base station. Therefore, the macro base station can process mobility of the virtual cell more agilely and efficiently. Details are as follows.

The user equipment measures the small cell, the macro cell, and a neighboring small cell of the small cell.

The user equipment further performs at least one of the following, when both signal quality of the small cell and signal quality of the neighboring small cell are lower than the preset threshold, and signal quality of the macro cell is in a stable state, switching, by the user equipment, to the single connection mode, and reporting the event A2 for the neighboring small cell, when signal quality of the small cell is lower than the preset threshold or a preset offset value, and signal quality of the neighboring small cell belonging to a same macro base station as the small cell is higher than the preset threshold, being handed over, by the user equipment, to the neighboring small cell, and reporting the event A2 and the event A3 for the neighboring cell, or when both signal quality of the small cell and signal quality of the macro cell are lower than the preset threshold, reconnecting or switching, by the user equipment, to a macro link or a small cell link, or reconfiguring, by the user equipment, a macro link, or switching to a macro link, and reporting the event A2 and the event A3 that are for the macro cell and the small cell, or reporting the event A2 and the event A3 for the macro cell and the event A2 for the small cell.

Figure 2:
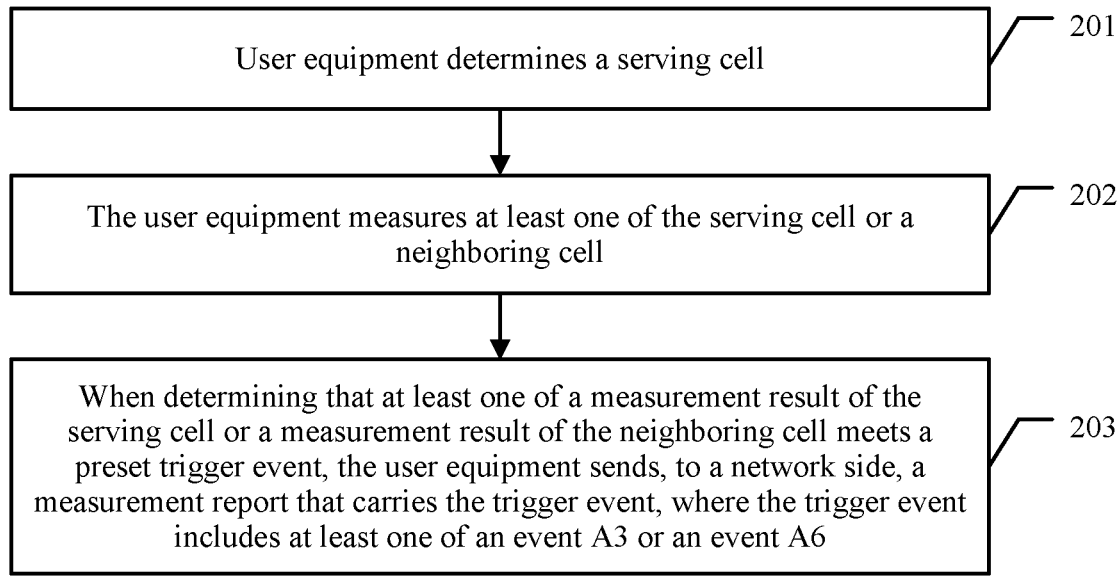
FIG. 2 is a flowchart of a cell measurement reporting method according to an embodiment of the present disclosure.

In addition, in a multiple connection scenario in which there is a virtual cell, for a real cell, the UE measures a cell-specific reference signal (CRS), and for the virtual cell, the UE measures a virtual cell-specific reference signal (VCRS). In addition, real cell measurement and virtual cell measurement are not distinguished in an existing measurement mechanism. The VCRS is transmitted by all real cells in the virtual cell, and therefore signal quality of the VCRS is higher than that of the CRS. Because measured signals are different, final measurement results are also different. In the present disclosure, the problem is resolved by extending a measurement event, so that the measurement event is triggered more properly and accurately. For details, refer to FIG. 2. An embodiment of the present disclosure includes the following steps.

201. User equipment determines a serving cell.

The user equipment may determine the serving cell from a macro cell and a small cell.

202. The user equipment measures at least one of the serving cell or a neighboring cell.

That the user equipment measures at least one of the serving cell or the neighboring cell mainly includes three cases, measuring the serving cell, measuring the serving cell and the neighboring cell, and measuring the neighboring cell, where the neighboring cell is a cell on a carrier frequency indicated by a measurement object associated with the serving cell.

203. When determining that at least one of a measurement result of the serving cell or a measurement result of the neighboring cell meets a preset trigger event, the user equipment sends, to a network side, a measurement report that carries the trigger event.

Specifically, the following three scenarios are included.

The user equipment measures the serving cell, and when determining that the measurement result of the serving cell meets the trigger event, sends, to the network side, the measurement report that carries the trigger event.

The user equipment measures the serving cell and the neighboring cell, and when determining that the measurement result of the serving cell and the measurement result of the neighboring cell meet the preset trigger event, sends, to the network side, the measurement report that carries the trigger event.

The user equipment measures the neighboring cell, and when determining that the measurement result of neighboring cell meets the trigger event, sends, to the network side, the measurement report that carries the trigger event.

The trigger event includes at least one of an event A3 or an event A6.

The event A3 includes between real cells, signal quality of the neighboring cell is higher than signal quality of a primary serving cell by a first offset value, and between a real cell and a virtual cell, a second offset value is higher than the signal quality of the primary serving cell.

Event A3 (Neighbor becomes offset 1 better than Pcell if between real cell (Rcell), offset 2 better than Pcell if between Rcell and virtual cell (Vcell)).

The event A6 includes between real cells, signal quality of the neighboring cell is higher than signal quality of a secondary serving cell by a first offset value; and between a real cell and a virtual cell, the second offset value is higher than the signal quality of the secondary serving cell.

Event A6 (Neighbor becomes offset 1 better than Scell if between Rcell, offset 2 better than Scell if between Rcell and Vcell).

For the event A3, the macro cell or the small cell is used as the serving cell.

For the event A6, the macro cell or the small cell is used as the serving cell.

In this embodiment of the present disclosure, by separately adding an offset value for the virtual cell in the event A3 and the event A6, a deviation between measurement results for a VCRS and a CRS is eliminated when the UE performs related measurement for the event A3 and the event A6, so that a measurement event is properly reported.

Optionally, in some embodiments of the disclosure, on the basis of distinguishing real cell measurement from virtual cell measurement, a redundant measurement reporting problem may be further reduced in the present disclosure by using the following means.

An independent measurement object is configured for each of the macro cell and the small cell. That is, when the user equipment uses a multiple connection mode, the measurement object includes a first measurement object and a second measurement object, so that the user equipment measures the macro cell according to the first measurement object, and measures the small cell according to the second measurement object, or the user equipment measures a virtual cell according to the first measurement object, and measures a real cell according to the second measurement object.

In addition, the network side includes the macro cell and/or a main transmission point, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell.

After completing separate measurement, the user equipment may send, to the macro cell, a measurement result corresponding to the first measurement object, and send, to the macro cell or the small cell or a main transmission point of the small cell, a measurement result corresponding to the second measurement object.

Alternatively, the user equipment sends, to the main transmission point of the virtual cell or the main transmission point of the cloud cell, a measurement result corresponding to the first measurement object, and sends, to one of the main transmission point of the virtual cell, the main transmission point of the cloud cell, or the real cell, a measurement result corresponding to the second measurement object.

Optionally, on the basis of configuring the independent measurement object for each of the macro cell and the small cell, redundant measurement reporting may be further reduced by adding a definition of the serving cell in a measurement program. Therefore, the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

Figure 3:
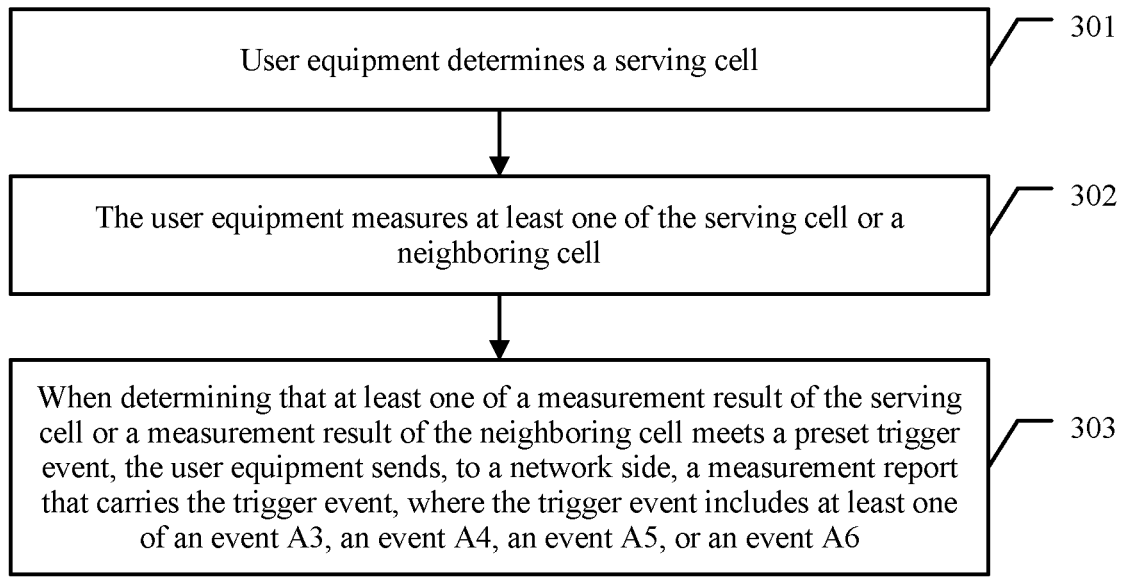
FIG. 3 is a flowchart of a cell measurement reporting method according to an embodiment of the present disclosure.

In addition, in an existing measurement mechanism, in a process of selecting a cell to camp on and to connect to, the UE needs to measure a current cell and a neighboring cell, and finally select a cell with relatively high or highest signal quality to camp on and to connect to. In this process, because a base station of the virtual cell and the macro base station frequently exchange measurement reports of the UE on a backhaul link, and especially for a flexible backhaul link in a UDN network architecture, the base station of the virtual cell and the macro base station excessively interact with each other. As a result, when a capacity of the backhaul link is insufficient, a throughput of the UE is reduced. In addition, when a hop count of a backhaul is excessively large, a service delay of the UE is increased. When the UE performs a handover procedure according to an existing measurement event, the UE is likely to be handed over to a cell with a backhaul link having a disadvantage. Consequently, the UE may be unable to normally perform some services, and user experience is reduced. Therefore, in this embodiment of the present disclosure, an event is redefined, so that the UE can select a cell suitable for camping and connection. Specifically, determining of backhaul link load and/or a hop count of a flexible backhaul link may be added, so that the macro base station processes mobility of the virtual cell more agilely and efficiently. Referring to FIG. 3, an embodiment of the present disclosure includes the following steps.

301. User equipment determines a serving cell.

The serving cell may be determined from a macro cell and a small cell, and the serving cell includes a primary serving cell and at least one secondary serving cell.

302. The user equipment measures at least one of the serving cell or a neighboring cell.

That the user equipment measures at least one of the serving cell or the neighboring cell mainly includes three cases, measuring the serving cell, measuring the serving cell and the neighboring cell, and measuring the neighboring cell, where the neighboring cell is a cell on a carrier frequency indicated by a measurement object associated with the serving cell.

303. The user equipment determines that at least one of a measurement result of the serving cell or a measurement result of the neighboring cell meets a preset trigger event, and sends, to a network side, a measurement report that carries the trigger event.

Specifically, the following three scenarios are included.

The user equipment measures the serving cell, and when determining that the measurement result of the serving cell meets the trigger event, sends, to the network side, the measurement report that carries the trigger event.

The user equipment measures the serving cell and the neighboring cell, and when determining that the measurement result of the serving cell and the measurement result of the neighboring cell meet the preset trigger event, sends, to the network side, the measurement report that carries the trigger event.

The user equipment measures the neighboring cell, and when determining that the measurement result of neighboring cell meets the trigger event, sends, to the network side, the measurement report that carries the trigger event.

The trigger event includes at least one of an event A3, an event A4, an event A5, or an event A6.

The event A3 includes signal quality of the neighboring cell is higher than signal quality of the primary serving cell by a third offset value, and the event A3 further includes at least one of the following, backhaul link load is greater than a locally requested available capacity of a backhaul link, or a hop count of a flexible backhaul link is less than a locally requested hop count.

Event A3 (Neighbor becomes offset better than Pcell, the affordable backhaul load is larger than local request and/or hop of flexible backhaul is lower than local request).

The event A4 includes signal quality of the neighboring cell is higher than a first threshold, and the event A4 further includes at least one of the following, backhaul link load is greater than a locally requested available capacity of a backhaul link, or a hop count of a flexible backhaul link is less than a locally requested hop count.

Event A4 (Neighbor becomes better than threshold the affordable backhaul load is larger than local request and/or hop of flexible backhaul is lower than local request).

The event A5 includes signal quality of the primary serving cell is lower than a second threshold, and signal quality of the neighboring cell is higher than a third threshold, and the event A5 further includes at least one of the following, backhaul link load is greater than a locally requested available capacity of a backhaul link, or a hop count of a flexible backhaul link is less than a locally requested hop count.

Event A5 (Pcell becomes worse than threshold1 and neighbor becomes better than threshold2, the affordable backhaul load is larger than local request or/and hop of flexible backhaul is lower than local request).

The event A6 includes signal quality of the neighboring cell is higher than signal quality of the secondary serving cell by a fourth offset value, and the event A6 further includes at least one of the following, backhaul link load is greater than a local request, or a hop count of a flexible backhaul link is less than a local request.

Event A6 (Neighbor becomes offset better than Scell, the affordable backhaul load is larger than local request and/or hop of flexible backhaul is lower than local request).

Figure 4:
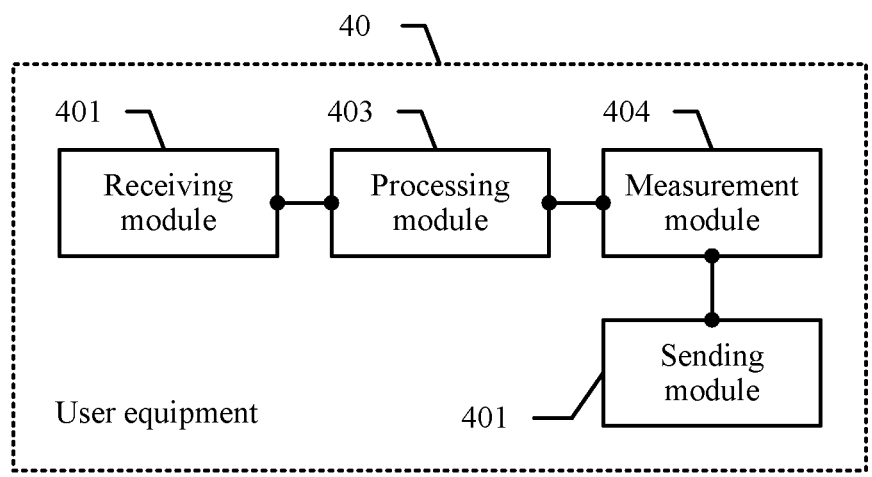
FIG. 4 is a schematic structural diagram of user equipment according to an embodiment of the present disclosure.

Referring to FIG. 4, the following describes in detail user equipment for performing the cell measurement reporting method. The user equipment includes a transmitter 401, a receiver 402 configured to receive measurement configuration information configured by a network side; a processing module 403 configured to select a serving cell according to the measurement configuration information received by the receiver 402, and a measurement module 404 configured to measure the serving cell according to the measurement configuration information, and when determining that a measurement result of the serving cell meets a preset trigger event, send, to the network side according to an indication of the measurement configuration information by using the transmitter 401, a measurement report that carries the trigger event.

The measurement module 404 is further configured to measure the serving cell and a neighboring cell according to the measurement configuration information, where the neighboring cell is a cell on a carrier frequency indicated by a measurement object associated with the serving cell, and when determining that a measurement result of the serving cell and a measurement result of the neighboring cell meet the trigger event, send, to the network side according to an indication of the measurement configuration information by using the transmitter 401, a measurement report that carries the trigger event.

Alternatively, the measurement module 404 is further configured to measure the neighboring cell according to the measurement configuration information; and when determining that a measurement result of the neighboring cell meets the trigger event, send, to the network side according to an indication of the measurement configuration information by using the transmitter 401, a measurement report that carries the trigger event.

In this embodiment of the present disclosure, the measurement module 404 measures the selected serving cell and/or the neighboring cell according to the measurement configuration information, and the transmitter 401 sends, to the network side according to the measurement configuration information, the measurement report that carries the trigger event. That is, when measuring only the serving cell, the user equipment performs measurement reporting for only the serving cell, and does not simultaneously perform measurement reporting for another cell, when measuring only the neighboring cell, the user equipment performs measurement reporting for only the neighboring cell, and does not perform measurement reporting for the serving cell, when measuring the selected serving cell and the neighboring cell of the serving cell, the user equipment performs measurement reporting for only the serving cell and the neighboring cell of the serving cell, and does not perform measurement reporting for another cell and a neighboring cell of the another cell. Therefore, a quantity of measurement reports is decreased. In addition, the user equipment may report a trigger event to only a measurement configuration entity according to the indication of the measurement configuration information, so that a quantity of measurement events that need to be reported can be further decreased, thereby reducing signaling consumption. Moreover, measurement reporting is pertinently performed for only the selected serving cell, and measurement reporting is not performed for an unrelated cell, so that measurement reporting efficiency is improved.

Optionally, the network side includes a macro cell and/or a main transmission point, and the serving cell is determined by the user equipment from the macro cell and a small cell. The main transmission point is a main transmission point of a virtual cell or a main transmission point of a cloud cell.

Optionally, the measurement configuration information includes at least one of the following, a configured measurement object, a frequency band of a measurement object, a cell list, a reporting manner, a measurement identifier, or an event parameter.

Optionally, in some embodiments of the disclosure, independent measurement may be configured for each of the macro cell and the small cell, and an independent reporting mechanism may be established for each of the macro cell and the small cell, so that a measurement event is more proper, accuracy of trigger event reporting is improved, and a trigger event for the macro cell is distinguished from that for the small cell. Details are as follows.

When the user equipment uses a multiple connection mode, the measurement object includes a first measurement object and a second measurement object, the serving cell includes a macro cell and a small cell, and the measurement module 404 is configured to measure the macro cell according to the first measurement object, and measure the small cell according to the second measurement object, or measure a virtual cell according to the first measurement object, and measure a real cell according to the second measurement object.

Optionally, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, in some embodiments of the disclosure, the transmitter 401 is configured to send, to the macro cell, a measurement result corresponding to the first measurement object, and send, to the macro cell or the small cell or a main transmission point of the small cell, a measurement result corresponding to the second measurement object, or send, to the main transmission point of the virtual cell or the main transmission point of the cloud cell, a measurement result corresponding to the first measurement object, and send, to one of the main transmission point of the virtual cell, the main transmission point of the cloud cell, or the real cell, a measurement result corresponding to the second measurement object. Because signal quality of the small cell is better than that of the macro cell in most scenarios, the small cell and the macro cell are not compared after separate configuration and measurement are used, that is, a result of comparison of the two types of cells is not reported, so that a quantity of measurement reports is decreased.

Optionally, in some embodiments of the disclosure, the measurement module 404 is further configured to when signal quality of the virtual cell is lower than a preset threshold, measure a neighboring virtual cell of the virtual cell, a real cell in the neighboring virtual cell, or a neighboring real cell of the virtual cell.

Optionally, in some embodiments of the disclosure, effectiveness of reporting an important trigger event can be improved by redefining, in a 3GPP 36.331 specification, the serving cell and a trigger event that needs to be reported.

The trigger event includes an event A2 and an event A3, and the serving cell meets one of the following, when the user equipment supports carrier aggregation, the serving cell includes a primary serving cell and at least one secondary serving cell, for the multiple connection mode, the serving cell is defined according to the configured measurement object; for the first measurement object, the serving cell is a primary serving cell configured with the first measurement object, or for the second measurement object, the serving cell is a main connection in the small cell.

The measurement procedures distinguish the following types of cells. 1. The serving cell(s)—these are the Pcell and one or more Scells, if configured for a UE supporting CA. For multiple connection mode scenario, the serving cell definition depends on measurement objects configured. For MeasObject, the serving cell is the cell which configures the measurement object; For MeasObjectSecondaryLink, the serving cell is the other (primary) link of the small cell. 2. Listed cells—these are cells listed within the measurement object(s). 3. Detected cells—these are cells that are not listed within the measurement object(s) but are detected by the UE on the carrier frequency(ies) indicated by the measurement object(s).

Optionally, in some embodiments of the disclosure, a to-be-measured frequency group may be redefined according to an operation mode of the UE, or on the basis of redefining the serving cell and configuring the independent measurement object for each of the macro cell and the serving cell, a to-be-measured frequency group may be redefined according to an operation mode of the UE. Therefore, only critical and useful measurement reports are reported, and reporting is more targeted and efficient. Specifically, there are the following two cases.

I. According to the Operation Mode of the User Equipment.

1. When the user equipment uses the multiple connection mode, the trigger event includes an event A3, an event A4, and an event A5, and when the user equipment uses the multiple connection mode, that the serving cell is determined by the user equipment from a macro cell and a small cell includes for the event A3, the event A4, and the event A5, using, by the user equipment, the macro cell as the serving cell, and the measurement module 404 is configured to separately measure the macro cell and the neighboring cell, where the neighboring cell includes a cell on a carrier frequency indicated by a measurement object associated with the macro cell.

2. When the user equipment uses a single connection mode, the trigger event includes an event A3, an event A4, and an event A5, and when the user equipment uses the single connection mode, that the serving cell is determined by the user equipment from a macro cell and a small cell includes for the event A3, the event A4, and the event A5, using, by the user equipment, both the macro cell and the small cell as the serving cell, and the measurement module 404 is configured to separately measure, by the user equipment, the macro cell, the small cell, and the neighboring cell, where the neighboring cell includes a cell on a carrier frequency indicated by a measurement object associated with the macro cell, and a cell on a carrier frequency indicated by a measurement object associated with the small cell.

II. Based on the Operation Mode of the UE and a Frequency Group, a to-be-Measured Frequency Group May be Specifically Selected by Redefining a Note of an Event.

The event A3, the event A4, and the event A5 meet at least one of the following.

1. Notes of the event A3 are modified in 3GPP TS36.331

The event A3 includes a cell in which the event A3 is triggered is indicated on a first frequency associated with the measurement object, where the first frequency is different from a frequency used by the primary serving cell, in the single connection mode, the measurement object includes a macro cell frequency group and a virtual cell frequency group, or in the multiple connection mode, the measurement object includes a macro cell frequency group.

Modified notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

2. A new note is added for the event A4 in TS36.331.

The event A4 includes a cell in which the event A4 is triggered is indicated on a second frequency associated with the measurement object, where the second frequency is different from a frequency used by the primary serving cell, or in the single connection mode, the measurement object includes a macro cell frequency group and a virtual cell frequency group, or in the multiple connection mode, the measurement object includes a macro cell frequency group.

New notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

3. Notes of the event A5 are modified in TS36.331. The event A5 includes a cell in which the event A5 is triggered is indicated on a third frequency associated with the measurement object, where the third frequency is different from a frequency used by the primary serving cell, or in the single connection mode, the measurement object includes a macro cell frequency group and a virtual cell frequency group, or in the multiple connection mode, the measurement object includes a macro cell frequency group.

Modified notes are as follows.

The cell(s) that triggers the event is on the frequency indicated in the associated MeasObject which may be different from the frequency used by the Pcell.

For single connection or multiple connection mode, the frequency list may include different frequency groups.

In single connection mode, both the macro frequency group and the virtual cell frequency group will be considered in measurement objects, for multiple connection mode, only macro frequency group is considered.

Optionally, in some embodiments of the disclosure, a new event may be added, in the 3GPP TS36.331, for a particular frequency group of the small cell, to predefine trigger events that are reported when the UE is in different operation modes, so as to improve flexibility of a measurement mechanism. In addition, the UE reports only crucial and useful measurement reports, and a quantity of measurement events that need to be reported is decreased, thereby reducing signaling consumption. For example, a new event A7, event A8, and event A9 are defined specially for the UE that uses the multiple connection mode, to replace the event A3, the event A4, and the event A5 in the original measurement mechanism, so that the UE uses the event A3, the event A4, and the event A5 when using the single connection mode, and uses the event A7, the event A8, and the event A9 when using the multiple connection mode.

1. When the user equipment uses the single connection mode, the trigger event includes the event A3, the event A4, and the event A5.

When the user equipment uses the multiple connection mode, the serving cell is the small cell, and the trigger event includes the event A7, the event A8, and the event A9.

2. Definitions of the new event A7, event A8, and event A9 are as follows.

The event A7 includes signal quality of the neighboring cell is higher than that of a serving cell in a frequency group to which the primary serving cell belongs by a fifth offset value.

Event A7 (replacing A3 in multiple connection mode) neighbor becomes offset better than serving within its own frequency groups.

The event A8 includes signal quality of the neighboring cell is higher than a fourth threshold corresponding to a frequency group to which the primary serving cell belongs by a sixth offset value.

Event A8 (replacing A4 in multiple connection mode) neighbor becomes offset better than threshold within its own frequency groups.

The event A9 includes signal quality of the primary serving cell is lower than a fifth threshold, and signal quality of the neighboring cell is higher than a sixth threshold corresponding to a frequency group to which the primary serving cell belongs by a seventh offset value.

Event A9 (replacing A5 in multiple connection mode) Pcell becomes worse than threshold1 and neighbor becomes better than threshold2 within its own frequency groups.

NOTE. UE will only consider Event A7/A8/A9 in multiple connection mode, and only consider Event A3/A4/A5 in single connection mode.

Optionally, in some embodiments of the disclosure, a behavior of the UE may be redefined according to a mobility scenario of a cell, so as to reduce measurement reports for the event A3, the event A4, or the event A5, and effectively reduce excessive exchange, of measurement reports on a backhaul link, between a base station of the virtual cell and the macro base station. Therefore, the macro base station can process mobility of the virtual cell more agilely and efficiently. Details are as follows.

The measurement module 404 measures the small cell, the macro cell, and a neighboring small cell of the small cell.

The processing module 403 performs one of the following, when both signal quality of the small cell and signal quality of the neighboring small cell are lower than the preset threshold, and signal quality of the macro cell is in a stable state, switching the user equipment to the single connection mode, and reporting the event A2 for the neighboring small cell by using the transmitter 401, when signal quality of the small cell is lower than the preset threshold or a preset offset value, and signal quality of the neighboring small cell belonging to a same macro base station as the small cell is higher than the preset threshold, handing over the user equipment to the neighboring small cell, and reporting the event A2 and the event A3 for the neighboring cell by using the transmitter 401, or when both signal quality of the small cell and signal quality of the macro cell are lower than the preset threshold, reconnecting or switching the user equipment to a macro link or a small cell link, or reconfiguring a macro link or switching the user equipment to a macro link, and reporting, by using the transmitter, the event A2 and the event A3 that are for the macro cell and the small cell, or reporting, by using the transmitter 401, the event A2 and the event A3 for the macro cell and the event A2 for the small cell.

Referring to FIG. 4, the following describes another user equipment in an embodiment of the present disclosure. In a multiple connection scenario in which there is a virtual cell, for a real cell, the UE measures a CRS, and for the virtual cell, the UE measures a VCRS. In addition, real cell measurement and virtual cell measurement are not distinguished in an existing measurement mechanism. The VCRS is transmitted by all real cells in the virtual cell, and therefore signal quality of the VCRS is higher than that of the CRS. Because measured signals are different, final measurement results are also different. In the present disclosure, the problem is resolved by extending a measurement event, so that the measurement event is triggered more properly and accurately. The user equipment 40 includes a transmitter 401, a processing module 403 configured to determine a serving cell, where the serving cell may be determined by the user equipment from a macro cell and a small cell, and a measurement module 404 configured to measure the serving cell, and when determining that a measurement result of the serving cell meets a preset trigger event, send, to a network side by using the transmitter 401, a measurement report that carries the trigger event, or measure the serving cell and a neighboring cell, and when determining that a measurement result of the serving cell meets a preset trigger event, send, to a network side by using the transmitter 401, a measurement report that carries the trigger event, or measure the neighboring cell, and when determining that a measurement result of the neighboring cell meets the trigger event, send, to a network side by using the transmitter 401, a measurement report that carries the trigger event, where the neighboring cell is a cell on a carrier frequency indicated by a measurement object associated with the serving cell, and the trigger event includes at least one of an event A3 or an event A6.

The event A3 includes between real cells, signal quality of the neighboring cell is higher than signal quality of a primary serving cell by a first offset value, and between a real cell and a virtual cell, a second offset value is higher than the signal quality of the primary serving cell.

The event A6 includes between real cells, signal quality of the neighboring cell is higher than signal quality of a secondary serving cell by a first offset value, and between a real cell and a virtual cell, the second offset value is higher than the signal quality of the secondary serving cell.

In this embodiment of the present disclosure, by separately adding an offset value for the virtual cell in the event A3 and the event A6, a deviation between measurement results for the VCRS and the CRS is eliminated when the UE performs related measurement for the event A3 and the event A6, so that a measurement event is properly reported.

Optionally, in some embodiments of the disclosure, the processing module 403 is configured to for the event A3, use a macro cell or a small cell as the serving cell, and for the event A6, use the macro cell or the small cell as the serving cell.

Optionally, in some embodiments of the disclosure, on the basis of distinguishing real cell measurement from virtual cell measurement, a redundant measurement reporting problem may be further reduced in the present disclosure by using the following means. When using a multiple connection mode, the user equipment configures an independent measurement object for each of the macro cell and the small cell, that is, the measurement object includes a first measurement object and a second measurement object. The measurement module 404 is configured to measure the macro cell according to the first measurement object, and measure the small cell according to the second measurement object, or measure a virtual cell according to the first measurement object, and measure a real cell according to the second measurement object.

Optionally, the network side includes the macro cell and/or a main transmission point, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell.

Optionally, in some embodiments of the disclosure, the transmitter 401 is configured to send, to the macro cell, a measurement result corresponding to the first measurement object, and send, to the macro cell or the small cell or a main transmission point of the small cell, a measurement result corresponding to the second measurement object, or send, to the main transmission point of the virtual cell or the main transmission point of the cloud cell, a measurement result corresponding to the first measurement object, and send, to one of the main transmission point of the virtual cell, the main transmission point of the cloud cell, or the real cell, a measurement result corresponding to the second measurement object.

Optionally, in some embodiments of the disclosure, the measurement module 404 is further configured to when signal quality of the virtual cell is lower than a preset threshold, measure a neighboring virtual cell of the virtual cell, a real cell in the neighboring virtual cell, or a neighboring real cell of the virtual cell.

Optionally, in some embodiments of the disclosure, on the basis of configuring the independent measurement object for each of the macro cell and the small cell, redundant measurement reporting may be further reduced by adding a definition of the serving cell in a measurement program in a 3GPP 36.331 specification. Therefore, the serving cell meets one of the following.

The serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

The measurement procedures distinguish the following types of cells. 2. The serving cell(s)—these are the Pcell and one or more Scells, if configured for a UE supporting CA. For multiple connection mode scenario, the serving cell definition depends on measurement objects configured. For MeasObject, the serving cell is the cell which configures the measurement object, For MeasObjectSecondaryLink, the serving cell is the other (primary) link of the small cell. 2. Listed cells—these are cells listed within the measurement object(s). 3. Detected cells—these are cells that are not listed within the measurement object(s) but are detected by the UE on the carrier frequency(ies) indicated by the measurement object(s).

Referring to FIG. 4, user equipment provided in an embodiment of the present disclosure is described. In an existing measurement mechanism, in a process of selecting a cell to camp on and to connect to, the UE needs to measure a current cell and a neighboring cell, and finally select a cell with relatively high or highest signal quality to camp on and to connect to. In this process, because a base station of a virtual cell and a macro base station frequently exchange measurement reports of the UE on a backhaul link, and especially for a flexible backhaul link in a UDN network architecture, the base station of the virtual cell and the macro base station excessively interact with each other. As a result, when a capacity of the backhaul link is insufficient, a throughput of the UE is reduced. In addition, when a hop count of a backhaul is excessively large, a service delay of the UE is increased. When the UE performs a handover procedure according to an existing measurement event, the UE is likely to be handed over to a cell with a backhaul link having a disadvantage. Consequently, the UE may be unable to normally perform some services, and user experience is reduced. Therefore, in this embodiment of the present disclosure, an event is redefined, so that the UE can select a cell suitable for camping and connection. Specifically, determining of backhaul link load and/or a hop count of a flexible backhaul link may be added.

The user equipment 40 in this embodiment of the present disclosure includes a transmitter 401, a processing module 403 configured to determine a serving cell, where the serving cell includes a primary serving cell and at least one secondary serving cell, and a measurement module 404 configured to measure the serving cell, and when determining that a measurement result of the serving cell meets a preset trigger event, send, to a network side by using the transmitter 401, a measurement report that carries the trigger event; or measure the serving cell and a neighboring cell, and when determining that a measurement result of the serving cell and a measurement result of the neighboring cell meet the trigger event, send, to a network side by using the transmitter 401, a measurement report that carries the trigger event, or measure the neighboring cell, and when determining that a measurement result of the neighboring cell meets the trigger event, send, to a network side by using the transmitter 401, a measurement report that carries the trigger event, where the neighboring cell is a cell on a carrier frequency indicated by a measurement object associated with the serving cell, and the trigger event includes at least one of an event A3, an event A4, an event A5, or an event A6.

The event A3 includes signal quality of the neighboring cell is higher than signal quality of the primary serving cell by a third offset value, and the event A3 further includes at least one of the following, backhaul link load is greater than a locally requested available capacity of a backhaul link, or a hop count of a flexible backhaul link is less than a locally requested hop count.

The event A4 includes signal quality of the neighboring cell is higher than a first threshold, and the event A4 further includes at least one of the following, backhaul link load is greater than a locally requested available capacity of a backhaul link, or a hop count of a flexible backhaul link is less than a locally requested hop count.

The event A5 includes signal quality of the primary serving cell is lower than a second threshold, and signal quality of the neighboring cell is higher than a third threshold, and the event A5 further includes at least one of the following, backhaul link load is greater than a locally requested available capacity of a backhaul link, or a hop count of a flexible backhaul link is less than a locally requested hop count.

The event A6 includes signal quality of the neighboring cell is higher than signal quality of the secondary serving cell by a fourth offset value, and the event A6 further includes at least one of the following, backhaul link load is greater than a locally requested available capacity of a backhaul link, or a hop count of a flexible backhaul link is less than a locally requested hop count.

The present disclosure further provides a computer storage medium. The medium stores a program, and when the program runs, some or all steps in the cell measurement reporting method are performed.

The present disclosure further provides a computer storage medium. The medium stores a program, and when the program runs, the user equipment performs some or all steps in the cell measurement reporting method.

Figure 5:
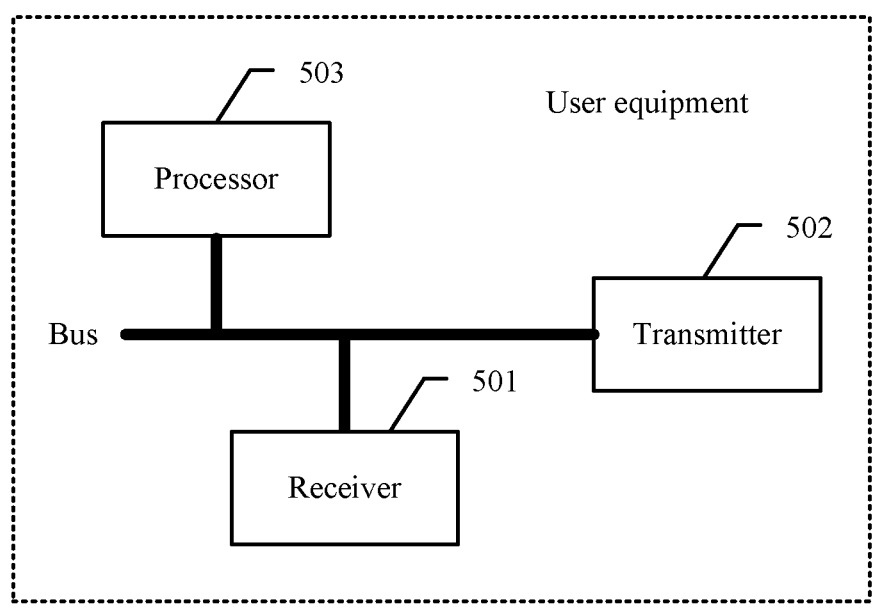
FIG. 5 is a schematic structural diagram of another user equipment according to an embodiment of the present disclosure.

FIG. 5 is another schematic structural diagram of user equipment 50 according to an embodiment of the present disclosure. The user equipment 50 may include at least one network interface or at least one other communications interface, at least one receiver 501, at least one transmitter 502, at least one processor 503, and a memory 504, so as to implement connection and communication between these apparatuses. The at least one network interface (which may be wired or wireless) may be used to implement communication and connection between the system gateway and at least one other network element over the Internet, a wide area network, a local network, a metropolitan area network, or the like.

The memory 504 may include a read-only memory and a random access memory, and provide an instruction and data for the processor 503. A part of the memory 504 may further include a high-speed random access memory (RAM), and may further include a non-volatile memory.

The memory 504 stores the following elements, an executable device or a data structure, a subset thereof, or an extended set thereof, an operation instruction, including various operation instructions and used for implementing various operations, and an operating system, including various system programs and used for implementing various basic services and processing a hardware-based task.

In this embodiment of the present disclosure, the processor 503 performs the following operations by invoking an operation instruction stored in the memory 504 (the operation instruction may be stored in the operating system) receiving, by using the receiver 501, measurement configuration information configured by a network side, selecting a serving cell according to the measurement configuration information received by the receiver 501, and measuring the serving cell according to the measurement configuration information, and when determining that a measurement result of the serving cell meets a preset trigger event, sending, to the network side according to an indication of the measurement configuration information by using the transmitter 502, a measurement report that carries the trigger event, measuring the serving cell and a neighboring cell according to the measurement configuration information, where the neighboring cell is a cell on a carrier frequency indicated by a measurement object associated with the serving cell, and when determining that a measurement result of the serving cell and a measurement result of the neighboring cell meet the trigger event, sending, to the network side according to an indication of the measurement configuration information by using the transmitter 502, a measurement report that carries the trigger event, or measuring the serving cell according to the measurement configuration information, and when determining that a measurement result of the serving cell meets a trigger event, sending, to the network side according to an indication of the measurement configuration information by using the transmitter 502, a measurement report that carries the trigger event.

The network side includes a macro cell and/or a main transmission point, and the serving cell is determined by the user equipment from the macro cell and a small cell.

The measurement configuration information includes at least one of the following, a configured measurement object, a frequency band of a measurement object, a cell list, a reporting manner, a measurement identifier, or an event parameter.

In some implementations, when the user equipment uses a multiple connection mode, the measurement object includes a first measurement object and a second measurement object, the serving cell includes a macro cell and a small cell, and the processor 503 may further perform the following steps, measuring the macro cell according to the first measurement object, and measuring the small cell according to the second measurement object, or measuring a virtual cell according to the first measurement object, and measuring a real cell according to the second measurement object.

Optionally, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell.

In some implementations, the processor 503 may further perform the following steps, sending, to the macro cell by using the transmitter 502, a measurement result corresponding to the first measurement object, and sending, to the macro cell or the small cell or a main transmission point of the small cell by using the transmitter 502, a measurement result corresponding to the second measurement object, or sending, to the main transmission point of the virtual cell or the main transmission point of the cloud cell by using the transmitter 502, a measurement result corresponding to the first measurement object, and sending, to one of the main transmission point of the virtual cell, the main transmission point of the cloud cell, or the real cell by using the transmitter 502, a measurement result corresponding to the second measurement object.

In some implementations, the processor 503 may further perform the following step, when signal quality of the virtual cell is lower than a preset threshold, measuring a neighboring virtual cell of the virtual cell, a real cell in the neighboring virtual cell, or a neighboring real cell of the virtual cell.

Optionally, the trigger event includes an event A2 and an event A3, and the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

Optionally, the trigger event includes an event A3, an event A4, and an event A5. When the user equipment uses the multiple connection mode, that the serving cell is determined by the user equipment from the macro cell and a small cell includes for the event A3, the event A4, and the event A5, using, by the user equipment, the macro cell as the serving cell.

In some implementations, the processor 503 may further perform the following step, separately measuring the macro cell and the neighboring cell, where the neighboring cell includes a cell on a carrier frequency indicated by a measurement object associated with the macro cell.

Optionally, the trigger event includes an event A3, an event A4, and an event A5. When the user equipment uses a single connection mode, that the serving cell is determined by the user equipment from the macro cell and a small cell includes for the event A3, the event A4, and the event A5, using, by the user equipment, both the macro cell and the small cell as the serving cell.

In some implementations, the processor 503 may further perform the following step, separately measuring the macro cell, the small cell, and the neighboring cell, where the neighboring cell includes a cell on a carrier frequency indicated by a measurement object associated with the macro cell, and a cell on a carrier frequency indicated by a measurement object associated with the small cell.

Optionally, the event A3, the event A4, and the event A5 meet at least one of the following, the event A3 includes a cell in which the event A3 is triggered is indicated on a first frequency associated with the measurement object, where the first frequency is different from a frequency used by the primary serving cell, in the single connection mode, the measurement object includes a macro cell frequency group and a virtual cell frequency group, or in the multiple connection mode, the measurement object includes a macro cell frequency group, the event A4 includes a cell in which the event A4 is triggered is indicated on a second frequency associated with the measurement object, where the second frequency is different from a frequency used by the primary serving cell, or in the single connection mode, the measurement object includes a macro cell frequency group and a virtual cell frequency group, or in the multiple connection mode, the measurement object includes a macro cell frequency group, and the event A5 includes a cell in which the event A5 is triggered is indicated on a third frequency associated with the measurement object, where the third frequency is different from a frequency used by the primary serving cell, or in the single connection mode, the measurement object includes a macro cell frequency group and a virtual cell frequency group, or in the multiple connection mode, the measurement object includes a macro cell frequency group.

Optionally, when the user equipment uses a single connection mode, the trigger event includes the event A3, an event A4, and an event A5.

When the user equipment uses the multiple connection mode, the serving cell is the small cell, and the trigger event includes an event A7, an event A8, and an event A9.

The event A7 includes signal quality of the neighboring cell is higher than that of a serving cell in a frequency group to which the primary serving cell belongs by a fifth offset value.

The event A8 includes signal quality of the neighboring cell is higher than a fourth threshold corresponding to a frequency group to which the primary serving cell belongs by a sixth offset value.

The event A9 includes signal quality of the primary serving cell is lower than a fifth threshold, and signal quality of the neighboring cell is higher than a sixth threshold corresponding to a frequency group to which the primary serving cell belongs by a seventh offset value.

In some implementations, the processor 503 may further perform the following step, measuring the small cell, the macro cell, and a neighboring small cell of the small cell.

In some implementations, the processor 503 may further perform one of the following steps, when both signal quality of the small cell and signal quality of the neighboring small cell are lower than the preset threshold, and signal quality of the macro cell is in a stable state, switching the user equipment to the single connection mode, and reporting the event A2 for the neighboring small cell by using the transmitter, when signal quality of the small cell is lower than the preset threshold or a preset offset value, and signal quality of the neighboring small cell belonging to a same macro base station as the small cell is higher than the preset threshold, handing over the user equipment to the neighboring small cell, and reporting the event A2 and the event A3 for the neighboring cell by using the transmitter, or when both signal quality of the small cell and signal quality of the macro cell are lower than the preset threshold, reconnecting or switching the user equipment to a macro link or a small cell link, or reconfiguring a macro link or switching the user equipment to a macro link, and reporting, by using the transmitter, the event A2 and the event A3 that are for the macro cell and the small cell, or reporting, by using the transmitter, the event A2 and the event A3 for the macro cell and the event A2 for the small cell.

Referring to FIG. 5, in this embodiment of the present disclosure, the processor 503 performs the following operations by invoking an operation instruction stored in the memory 504 (the operation instruction may be stored in the operating system) determining a serving cell, and measuring the serving cell, and when determining that a measurement result of the serving cell meets a preset trigger event, sending, to a network side by using the transmitter 502, a measurement report that carries the trigger event, or measuring the serving cell and a neighboring cell, and when determining that a measurement result of the serving cell meets a preset trigger event, sending, to a network side by using the transmitter 502, a measurement report that carries the trigger event; or measuring the neighboring cell, and when determining that a measurement result of the neighboring cell meets the trigger event, sending, to a network side by using the transmitter 502, a measurement report that carries the trigger event, where the neighboring cell is a cell on a carrier frequency indicated by a measurement object associated with the serving cell, and the trigger event includes at least one of an event A3 or an event A6.

The event A3 includes between real cells, signal quality of the neighboring cell is higher than signal quality of a primary serving cell by a first offset value, and between a real cell and a virtual cell, a second offset value is higher than the signal quality of the primary serving cell.

The event A6 includes between real cells, signal quality of the neighboring cell is higher than signal quality of a secondary serving cell by a first offset value, and between a real cell and a virtual cell, the second offset value is higher than the signal quality of the secondary serving cell.

In some implementations, the processor 503 may further perform the following steps, for the event A3, using a macro cell or a small cell as the serving cell, and for the event A6, using the macro cell or the small cell as the serving cell.

In some implementations, when the user equipment uses a multiple connection mode, the measurement object includes a first measurement object and a second measurement object, and the processor 503 may further perform the following steps, measuring the macro cell according to the first measurement object, and measuring the small cell according to the second measurement object, or measuring a virtual cell according to the first measurement object, and measuring a real cell according to the second measurement object.

Optionally, the network side includes the macro cell and/or a main transmission point, the first measurement object is configured by the macro cell for a frequency band of a macro base station, and the second measurement object is configured by the macro cell for a frequency band of the small cell, or the first measurement object is configured by the main transmission point for a frequency band of the virtual cell, and the second measurement object is configured by the main transmission point for a frequency band of the real cell.

Optionally, the main transmission point is a main transmission point of the virtual cell or a main transmission point of a cloud cell.

The processor 503 may further perform the following steps, sending, to the macro cell by using the transmitter 502, a measurement result corresponding to the first measurement object, and sending, to the macro cell or the small cell or a main transmission point of the small cell by using the transmitter 502, a measurement result corresponding to the second measurement object, or sending, to the main transmission point of the virtual cell or the main transmission point of the cloud cell by using the transmitter 502, a measurement result corresponding to the first measurement object, and sending, to one of the main transmission point of the virtual cell, the main transmission point of the cloud cell, or the real cell by using the transmitter 502, a measurement result corresponding to the second measurement object.

The processor 503 may further perform the following step, when signal quality of the virtual cell is lower than a preset threshold, measuring a neighboring virtual cell of the virtual cell, a real cell in the neighboring virtual cell, or a neighboring real cell of the virtual cell.

Optionally, the serving cell meets one of the following, when the user equipment supports carrier aggregation, the serving cell includes a primary serving cell and at least one secondary serving cell, for the multiple connection mode, the serving cell is defined according to the configured measurement object, for the first measurement object, the serving cell is a primary serving cell configured with the first measurement object, or for the second measurement object, the serving cell is a main connection in the small cell.

Referring to FIG. 5, in this embodiment of the present disclosure, the processor 503 performs the following operations by invoking an operation instruction stored in the memory 504 (the operation instruction may be stored in the operating system) determining a serving cell, where the serving cell includes a primary serving cell and at least one secondary serving cell, and measuring the serving cell, and when determining that a measurement result of the serving cell meets a preset trigger event, sending, to a network side by using the transmitter 502, a measurement report that carries the trigger event, or measuring the serving cell and a neighboring cell, and when determining that a measurement result of the serving cell and a measurement result of the neighboring cell meet the trigger event, sending, to a network side by using the transmitter 502, a measurement report that carries the trigger event; or measuring the neighboring cell, and when determining that a measurement result of the neighboring cell meets the trigger event, sending, to a network side by using the transmitter 502, a measurement report that carries the trigger event, where the neighboring cell is a cell on a carrier frequency indicated by a measurement object associated with the serving cell, and the trigger event includes at least one of an event A3, an event A4, an event A5, or an event A6.

The event A3 includes signal quality of the neighboring cell is higher than signal quality of the primary serving cell by a third offset value, and the event A3 further includes at least one of the following, backhaul link load is greater than a locally requested available capacity of a backhaul link, or a hop count of a flexible backhaul link is less than a locally requested hop count.

The event A4 includes signal quality of the neighboring cell is higher than a first threshold, and the event A4 further includes at least one of the following, backhaul link load is greater than a locally requested available capacity of a backhaul link, or a hop count of a flexible backhaul link is less than a locally requested hop count.

The event A5 includes signal quality of the primary serving cell is lower than a second threshold, and signal quality of the neighboring cell is higher than a third threshold, and the event A5 further includes at least one of the following, backhaul link load is greater than a locally requested available capacity of a backhaul link, or a hop count of a flexible backhaul link is less than a locally requested hop count.

The event A6 includes signal quality of the neighboring cell is higher than signal quality of the secondary serving cell by a fourth offset value and the event A6 further includes at least one of the following, backhaul link load is greater than a locally requested available capacity of a backhaul link, or a hop count of a flexible backhaul link is less than a locally requested hop count.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure may be implemented in the form of a software product. The software product is stored in a storage medium and includes several instructions for instructing a computer device (which may be a personal computer, a server, a network device, or the link) to perform all or some of the steps of the methods described in the embodiments of the present disclosure. The foregoing storage medium includes any medium that can store program code, such as a USB flash drive, a removable hard disk, a read-only memory (ROM), a RAM, a magnetic disk, or an optical disc.

The cell measurement reporting method and the user equipment provided in the present disclosure are described in detail above. Principles and implementations of the present disclosure are described in this specification by using specific examples. The descriptions about the embodiments are merely provided to help understand the method and core ideas of the present disclosure. In addition, a person of ordinary skill in the art can make modifications to a specific implementation and an application scope according to the ideas of the present disclosure. In conclusion, the content of this specification shall not be construed as a limitation on the present disclosure.

What is claimed is:

1. A cell measurement reporting method comprising:
    determining, by a user equipment, a serving cell; and
    measuring, by the user equipment, one or more of the serving cell or a neighboring cell; and
    sending, to a network side, a measurement report comprising a preset trigger event when a measurement result of one or more of the serving cell or the neighboring cell corresponds to the preset trigger event,
    wherein the neighboring cell is a cell on a carrier frequency indicated by a measurement object associated with the serving cell,
    wherein the trigger event comprises at least one of an event A3 or an event A6,
    wherein the event A3 comprises:
        a signal quality of the neighboring cell is higher than signal quality of a primary serving cell by a first offset value between real cells; and
        a second offset value is higher than the signal quality of the primary serving cell between a real cell and a virtual cell, and
    wherein the event A6 comprises:
        the signal quality of the neighboring cell is higher than a signal quality of a secondary serving cell by the first offset value between real cells; and
        the second offset value is higher than the signal quality of the secondary serving cell between a real cell and a virtual cell.

2. The method of claim 1, wherein determining the serving cell comprises using a macro cell or a small cell as the serving cell.

3. The method of claim 1, wherein when the user equipment uses a multiple connection mode, the measurement object comprises a first measurement object and a second measurement object, and wherein measuring the serving cell comprises either:
    measuring, by the user equipment, the macro cell according to the first measurement object, and measuring the small cell according to the second measurement object; or
    measuring, by the user equipment, a virtual cell according to the first measurement object, and measuring a real cell according to the second measurement object.

4. The method of claim 3, wherein the network side comprises the macro cell or a main transmission point, wherein the first measurement object is configured by the macro cell for a frequency band of a macro base station or the first measurement object is configured by the main transmission point for a frequency band of the virtual cell, and wherein the second measurement object is configured by the macro cell for a frequency band of the small cell or the second measurement object is configured by the main transmission point for a frequency band of the real cell.

5. The method of claim 4, wherein the main transmission point is a main transmission point of the virtual cell or a main transmission point of a cloud cell.

6. The method of claim 5, wherein sending the measurement report comprises either:
    sending, by the user equipment to the macro cell, a measurement result corresponding to the first measurement object, and sending, to the macro cell, the small cell, or a main transmission point of the small cell, a measurement result corresponding to the second measurement object; or
    sending, by the user equipment to the main transmission point of the virtual cell or the main transmission point of the cloud cell, a measurement result corresponding to the first measurement object, and sending, to one of the main transmission point of the virtual cell, the main transmission point of the cloud cell, or the real cell, a measurement result corresponding to the second measurement object.

7. The method of claim 6, wherein the method further comprises measuring, by the user equipment, a neighboring virtual cell of the virtual cell, a real cell in the neighboring virtual cell, or a neighboring real cell of the virtual cell when signal quality of the virtual cell is lower than a preset threshold.

8. The method of claim 3, wherein the serving cell corresponds to one of:
when the user equipment supports carrier aggregation, the serving cell comprises a primary serving cell and at least one secondary serving cell;
for the multiple connection mode, the serving cell is defined according to the configured measurement object;
for the first measurement object, the serving cell is a primary serving cell configured with the first measurement object; or
for the second measurement object, the serving cell is a main connection in the small cell.

9. A cell measurement reporting method comprising:
determining, by a user equipment, a serving cell comprising a primary serving cell and at least one secondary serving cell;
measuring, by the user equipment, one or more of the serving cell or a neighboring cell; and
sending, to a network side, a measurement report comprising a preset trigger event when a measurement result of one or more of the serving cell or the neighboring cell corresponds to the preset trigger event,
wherein the preset trigger event comprises at least one of an event A3, an event A4, an event A5, or an event A6,
wherein the event A3 comprises a signal quality of the neighboring cell is higher than signal quality of the primary serving cell by a corresponding offset value, and wherein the event A3 further comprises at least one of:
a backhaul link load is greater than a locally requested available capacity of a backhaul link; or
a hop count of a flexible backhaul link is less than a locally requested hop count,
wherein the event A4 comprises signal quality of the neighboring cell is higher than a first threshold, and wherein the event A4 further comprises at least one of:
the backhaul link load is greater than a locally requested available capacity of a backhaul link; or
the hop count of a flexible backhaul link is less than a locally requested hop count;
wherein the event A5 comprises signal quality of the primary serving cell is lower than a second threshold, and wherein a signal quality of the neighboring cell is higher than a third threshold, and wherein the event A5 further comprises at least one of:
backhaul link load is greater than a locally requested available capacity of a backhaul link; or
a hop count of a flexible backhaul link is less than a locally requested hop count; and
wherein the event A6 comprises signal quality of the neighboring cell is higher than signal quality of the secondary serving cell by a corresponding offset value, and wherein the event A6 further comprises at least one of:
backhaul link load is greater than a locally requested available capacity of a backhaul link; or
a hop count of a flexible backhaul link is less than a locally requested hop count.

10. A user equipment comprising:
a transmitter;
a processor coupled to the transmitter and configured to:
determine a serving cell;
measure one or more of the serving cell or a neighboring cell; and
send, to a network side via the transmitter, a measurement report comprising a preset trigger event when a measurement result of one or more of the serving cell or the neighboring cell corresponds to the preset trigger event,
wherein the neighboring cell is a cell on a carrier frequency indicated by a measurement object associated with the serving cell,
wherein the trigger event comprises at least one of an event A3 or an event A6,
wherein the event A3 comprises:
a signal quality of the neighboring cell is higher than a signal quality of a primary serving cell by a first offset value between real cells; and
a second offset value is higher than the signal quality of the primary serving cell between a real cell and a virtual cell, and
wherein the event A6 comprises:
the signal quality of the neighboring cell is higher than a signal quality of a secondary serving cell by a first offset value between real cells; and
the second offset value is higher than the signal quality of the secondary serving cell between a real cell and a virtual cell.

11. The user equipment of claim 10, wherein the processor is further configured to use a macro cell or a small cell as the serving cell.

12. The user equipment of claim 10, wherein when the user equipment uses a multiple connection mode, the measurement object comprises a first measurement object and a second measurement object, and the processor is further configured to:
measure the macro cell according to the first measurement object, and measure the small cell according to the second measurement object; or
measure a virtual cell according to the first measurement object, and measure a real cell according to the second measurement object.

13. The user equipment of claim 12, wherein the network side comprises the macro cell or a main transmission point, wherein the first measurement object is configured by the macro cell for a frequency band of a macro base station or the first measurement object is configured by the main transmission point for a frequency band of the virtual cell, and wherein the second measurement object is configured by the macro cell for a frequency band of the small cell or the second measurement object is configured by the main transmission point for a frequency band of the real cell.

14. The user equipment of claim 13, wherein the main transmission point is a main transmission point of the virtual cell or a main transmission point of a cloud cell.

15. The user equipment of claim 14, wherein the transmitter is further configured to either:
send, to the macro cell, a measurement result corresponding to the first measurement object, and send, to the macro cell, the small cell, or a main transmission point of the small cell, a measurement result corresponding to the second measurement object; or
send, to the main transmission point of the virtual cell or the main transmission point of the cloud cell, a measurement result corresponding to the first measurement object, and send, to one of the main transmission point of the virtual cell, the main transmission point of the cloud cell, or the real cell, a measurement result corresponding to the second measurement object.

16. The user equipment of claim 15, wherein the processor is further configured to measure a neighboring virtual cell of the virtual cell, a real cell in the neighboring virtual cell, or a neighboring real cell of the virtual cell when signal quality of the virtual cell is lower than a preset threshold.

17. The user equipment of claim 12, wherein the serving cell corresponds to one of:
- when the user equipment supports carrier aggregation, the serving cell comprises a primary serving cell and at least one secondary serving cell;
- for the multiple connection mode, the serving cell is defined according to the configured measurement object;
- for the first measurement object, the serving cell is a primary serving cell configured with the first measurement object; or
- for the second measurement object, the serving cell is a main connection in the small cell.

* * * * *